(12) United States Patent
Dan et al.

(10) Patent No.: US 11,014,233 B2
(45) Date of Patent: May 25, 2021

(54) TEACHING POINT CORRECTING METHOD, PROGRAM, RECORDING MEDIUM, ROBOT APPARATUS, IMAGING POINT CREATING METHOD, AND IMAGING POINT CREATING APPARATUS

(71) Applicant: CANON KABUSHIKI KAISHA, Tokyo (JP)

(72) Inventors: Keita Dan, Tokyo (JP); Hideaki Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 298 days.

(21) Appl. No.: 15/768,821

(22) PCT Filed: Sep. 23, 2016

(86) PCT No.: PCT/JP2016/078965
§ 371 (c)(1),
(2) Date: Apr. 16, 2018

(87) PCT Pub. No.: WO2017/068930
PCT Pub. Date: Apr. 27, 2017

(65) Prior Publication Data
US 2018/0297198 A1    Oct. 18, 2018

(30) Foreign Application Priority Data
Oct. 22, 2015   (JP) .............................. JP2015-207631

(51) Int. Cl.
*B25J 9/16*    (2006.01)

(52) U.S. Cl.
CPC ............. *B25J 9/163* (2013.01); *B25J 9/1697* (2013.01)

(58) Field of Classification Search
None
See application file for complete search history.

(56) References Cited

U.S. PATENT DOCUMENTS 4,362,977 A * 12/1982 Evans .................... B25J 9/1692
                                                                 318/568.11
4,380,696 A *  4/1983 Masaki .................. B25J 19/023
                                                                 219/124.34
(Continued)

FOREIGN PATENT DOCUMENTS

DE        19930087 A1    1/2001
JP        H02-287164     11/1990
(Continued)

OTHER PUBLICATIONS

Japanese Office Action dated Aug. 6, 2019 during prosecution of related Japanese application No. 2015-207631. (English-language machine translation included.).
(Continued)

*Primary Examiner* — Bhavesh V Amin
(74) *Attorney, Agent, or Firm* — Venable LLP

(57) ABSTRACT

Indicators are set on a marker positioned on a working stage in conformity with a target teaching point. A stereo camera images the indicator in a state of being positioned on a robot hand, and measures the three-dimensional position of the marker. In robot arm controlling, the robot hand is positioned at the correction teaching point for off-line that is offset from an off-line teaching point in the depth of field direction of the stereo camera. In imaging, while the robot hand is positioned at the correction teaching point for off-line, the indicators are imaged by the stereo camera. In correcting, based on an imaging result of the indicator, the on-line teaching point is corrected toward the target teaching point to obtain the on-line teaching point.

16 Claims, 13 Drawing Sheets

(56) References Cited

U.S. PATENT DOCUMENTS

| | | | | |
|---|---|---|---|---|
| 4,481,592 A * | 11/1984 | Jacobs | ............... | B25J 9/1692 318/568.14 |
| 4,562,391 A * | 12/1985 | Inoue | ............... | B25J 9/046 219/124.1 |
| 4,670,849 A * | 6/1987 | Okada | ............... | G05B 19/4083 318/632 |
| 4,753,569 A * | 6/1988 | Pryor | ............... | A01B 69/008 250/201.1 |
| 4,796,200 A * | 1/1989 | Pryor | ............... | B25J 9/1692 348/95 |
| 4,831,549 A * | 5/1989 | Red | ............... | G05B 19/4182 700/254 |
| 4,853,771 A * | 8/1989 | Witriol | ............... | B25J 9/1697 348/94 |
| 4,891,767 A * | 1/1990 | Rzasa | ............... | B25J 9/1692 382/151 |
| 5,297,238 A * | 3/1994 | Wang | ............... | B25J 9/1692 700/254 |
| 5,329,469 A * | 7/1994 | Watanabe | ............... | B25J 9/1697 348/95 |
| 5,400,638 A | 3/1995 | Kim | | |
| 5,511,007 A * | 4/1996 | Nihei | ............... | B23K 9/127 700/177 |
| 5,570,190 A * | 10/1996 | Terawaki | ............... | B25J 9/1692 348/95 |
| 5,572,103 A | 11/1996 | Terada | | |
| 5,960,125 A * | 9/1999 | Michael | ............... | G06T 7/80 382/151 |
| 5,978,521 A * | 11/1999 | Wallack | ............... | G01B 11/002 382/287 |
| 6,044,308 A * | 3/2000 | Huissoon | ............... | B25J 9/1692 700/166 |
| 6,071,060 A * | 6/2000 | Campbell | ............... | B25J 9/1692 414/273 |
| 6,075,881 A * | 6/2000 | Foster | ............... | G06K 9/4604 382/141 |
| 6,101,455 A * | 8/2000 | Davis | ............... | B25J 9/1697 382/153 |
| 6,128,585 A * | 10/2000 | Greer | ............... | G01B 11/002 356/139.03 |
| 6,192,298 B1 * | 2/2001 | Nishikawa | ............... | B25J 9/1692 318/568.16 |
| 6,236,896 B1 * | 5/2001 | Watanabe | ............... | B25J 9/1692 414/730 |
| 6,356,808 B1 * | 3/2002 | Stenberg | ............... | B25J 9/1692 318/568.1 |
| 6,381,366 B1 * | 4/2002 | Taycher | ............... | G06T 7/33 382/199 |
| 6,430,474 B1 * | 8/2002 | DiStasio | ............... | B25J 9/1697 318/568.1 |
| 6,687,402 B1 * | 2/2004 | Taycher | ............... | G06K 9/6204 382/199 |
| 6,748,104 B1 * | 6/2004 | Bachelder | ............... | G06T 7/001 382/147 |
| 6,798,925 B1 * | 9/2004 | Wagman | ............... | G06T 7/80 356/620 |
| 7,089,085 B2 * | 8/2006 | Kim | ............... | B25J 9/1692 348/159 |
| 7,113,878 B1 * | 9/2006 | Loferer | ............... | G01B 21/042 702/104 |
| 7,196,721 B2 * | 3/2007 | Uchiyama | ............... | G06T 7/80 348/187 |
| 7,200,260 B1 * | 4/2007 | Watanabe | ............... | B25J 9/1692 382/103 |
| 7,894,661 B2 * | 2/2011 | Kosaka | ............... | G06T 5/006 382/154 |
| 8,135,208 B1 * | 3/2012 | Vangal-Ramamurthy | ............... | G06T 7/80 382/153 |
| 8,180,487 B1 * | 5/2012 | Vangal-Ramamurthy | ............... | B25J 9/1692 700/259 |
| 8,350,913 B2 * | 1/2013 | Ban | ............... | B25J 9/1692 348/187 |
| 8,688,274 B2 * | 4/2014 | Shieh | ............... | B25J 9/1692 700/254 |
| 9,050,728 B2 * | 6/2015 | Ban | ............... | B25J 9/1692 |
| 9,075,411 B2 * | 7/2015 | Aiso | ............... | B25J 9/1692 |
| 9,189,702 B2 * | 11/2015 | Wang | ............... | G06K 9/4604 |
| 9,221,176 B2 * | 12/2015 | Suzuki | ............... | B25J 9/1697 |
| 9,278,454 B2 | 3/2016 | Mimura et al. | | |
| 9,669,545 B2 | 6/2017 | Suzuki et al. | | |
| 9,981,380 B2 * | 5/2018 | Setsuda | ............... | B25J 9/1633 |
| 10,434,654 B2 * | 10/2019 | Namiki | ............... | B25J 9/163 |
| 10,525,597 B2 * | 1/2020 | Harada | ............... | B25J 9/1692 |
| 2002/0013675 A1 * | 1/2002 | Knoll | ............... | B25J 9/1692 702/150 |
| 2004/0202362 A1 | 10/2004 | Ishikawa | | |
| 2005/0107920 A1 * | 5/2005 | Ban | ............... | G05B 19/4083 700/245 |
| 2010/0161125 A1 * | 6/2010 | Aoba | ............... | G06T 1/00 700/254 |
| 2016/0288332 A1 * | 10/2016 | Motoyoshi | ............... | B25J 9/1697 |
| 2017/0217020 A1 | 8/2017 | Suzuki et al. | | |
| 2018/0104820 A1 * | 4/2018 | Troy | ............... | G01B 3/20 |
| 2018/0222056 A1 * | 8/2018 | Suzuki | ............... | B25J 9/0096 |
| 2018/0297198 A1 * | 10/2018 | Dan | ............... | B25J 9/1697 |
| 2020/0363501 A1 * | 11/2020 | Lau | ............... | G01S 15/931 |

FOREIGN PATENT DOCUMENTS

| | | |
|---|---|---|
| JP | H07-84631 A | 3/1995 |
| JP | 2002-307348 | 10/2002 |
| JP | 2015-62991 | 4/2015 |

OTHER PUBLICATIONS

PCT International Search Report and Written Opinion of the International Searching Authority in International Application No. PCT/JP2016/078965.

U.S. Appl. No. 15/889,804, filed Feb. 6, 2018. Applicant: Hideaki Suzuki, et al.

U.S. Appl. No. 15/883,711, filed Jan. 30, 2018. Applicant: Hideaki Suzuki, et al.

PCT International Preliminary Report on Patentability dated Apr. 24, 2018 in PCT/JP2016/078965.

\* cited by examiner

OFF-LINE TEACHING POINT

CORRECTION TEACHING POINT FOR OFF-LINE

FIG. 8A
CORRECTION TEACHING POINT FOR ON-LINE
FIG. 8B
ON-LINE TEACHING POINT
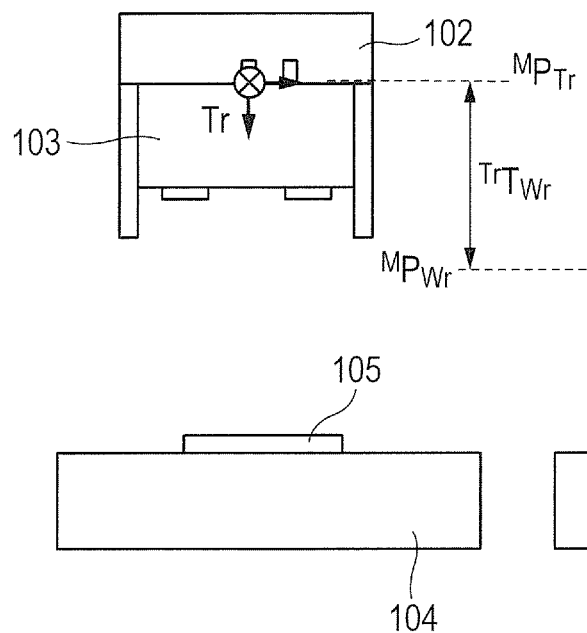
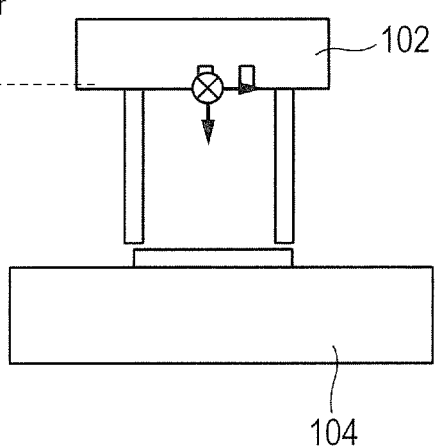

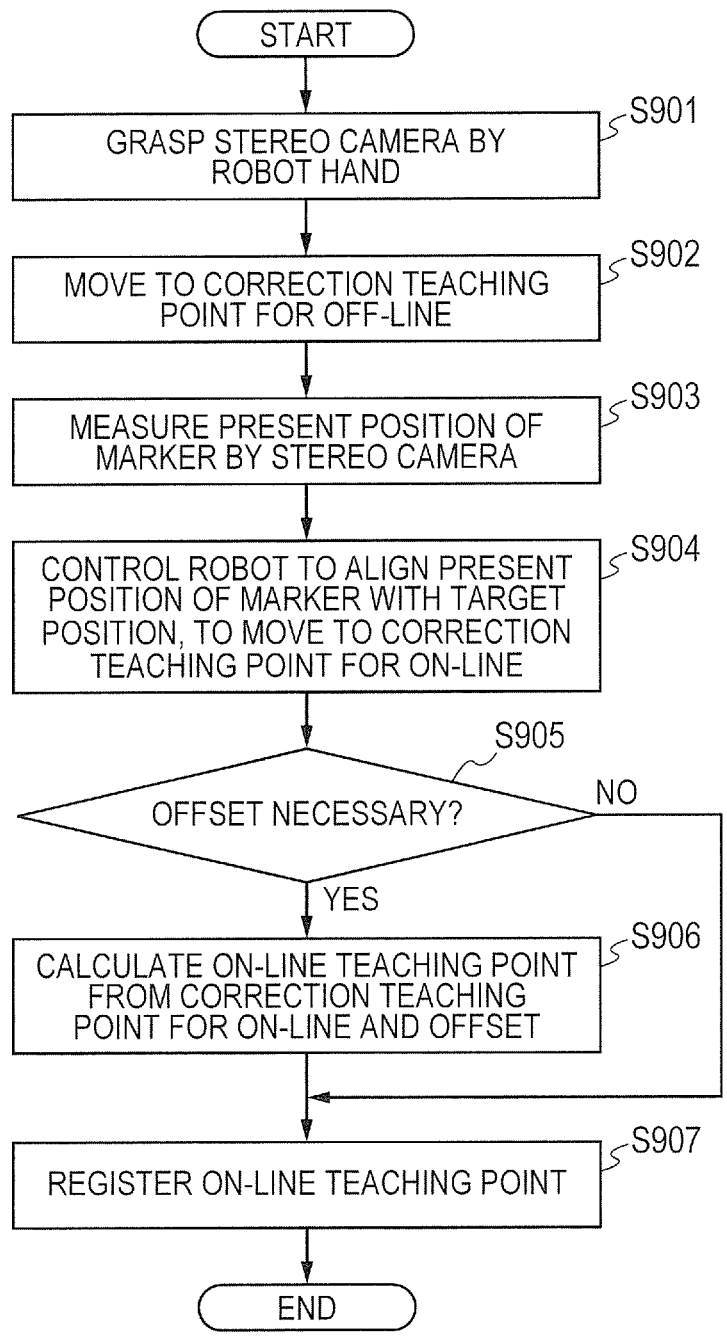

OFF-LINE TEACHING

ON-LINE TEACHING

CORRECTION OF
ON-LINE OFFSET

OFF-LINE TEACHING

ON-LINE TEACHING

CORRECTION OF ON-LINE OFFSET

TEACHING POINT CORRECTING METHOD, PROGRAM, RECORDING MEDIUM, ROBOT APPARATUS, IMAGING POINT CREATING METHOD, AND IMAGING POINT CREATING APPARATUS

TECHNICAL FIELD

The present invention relates to a teaching point correcting method in a robot apparatus that achieves assembling work using a multi-joint robot arm, a program, a recording medium, a robot apparatus, an imaging point creating method, and an imaging point creating apparatus.

BACKGROUND ART

A robot apparatus that moves a working unit by a multi-joint robot arm to perform a process such as grasping an object, and achieves an assembling work has been widely used. One actually used approach in the robot apparatus is to virtually simulate in advance, by a computer, and set the processing position of an object taken by the working unit and the movement path of the working unit. This approach is referred to as off-line teaching. The processing position determined here is referred to as an off-line teaching point.

Unfortunately, an accumulated error in units of millimeters occurs at the off-line teaching point owing to the difference in individual robot apparatuses. To address this error, on-line teaching is performed for each of individual robot apparatuses, thereby correcting the off-line teaching point.

PTL 1 describes an on-line teaching method in which, by a three-dimensional visual sensor positioned at the working unit, an indicator set at an object side in conformity with a teaching point is imaged to measure a three-dimensional position, thereby obtaining the position offset quantity of the off-line teaching point to correct the teaching point.

CITATION LIST

Patent Literature

PTL 1: Japanese Patent Application Laid-Open No. H07-84631

SUMMARY OF INVENTION

Technical Problem

According to PTL 1, if the indicator is out of the measurement range of a three-dimensional visual sensor in the depth of field direction after the working unit is positioned at the teaching point, the position of the indicator cannot be accurately obtained by the three-dimensional visual sensor. If the indicator is in a range in which the measurement accuracy decreases, such as around an edge of the angle of view, even with the indicator being within the measurement range in the depth of field direction of the three-dimensional visual sensor, the position of the indicator cannot be accurately obtained by the three-dimensional visual sensor.

An object of the present invention is to provide a teaching point correcting method, a program, a recording medium, a robot apparatus, an imaging point creating method and an imaging point creating apparatus that can accurately correct the teaching point of the working unit even if the performance of the three-dimensional visual sensor has a limitation on, for example, depth of field.

Solution to Problem

According to an aspect of the present invention, a teaching point correcting method for a robot apparatus that includes a multi-joint robot arm for moving a working unit, and a controlling unit for controlling the multi-joint robot arm, the method comprises: controlling, by the controlling unit, the multi-joint robot arm so that the working unit can be positioned at an imaging point offset from a teaching point before correction in a direction including a depth of field direction of a three-dimensional visual sensor mounted on the working unit; imaging an indicator by the three-dimensional visual sensor while the controlling unit causes the working unit to be positioned at the imaging point during the controlling the robot arm; and correcting the teaching point before correction by the controlling unit, based on an imaging result of the indicator in the imaging.

According to the teaching point correcting method of the present invention, the working unit is positioned at the imaging point offset with respect to the indicator in the direction including the depth of field direction of the three-dimensional visual sensor and then the position of the indicator is measured. Consequently, even with a limitation on, for example, depth of field, in the three-dimensional visual sensor, the teaching point of the working unit can be accurately corrected.

Further features of the present invention will become apparent from the following description of exemplary embodiments with reference to the attached drawings.

BRIEF DESCRIPTION OF DRAWINGS

FIGS. 8A and 8B are diagrams illustrating a correction teaching point for on-line.

FIG. 9 is a flowchart of controlling setting of an on-line teaching point.

DESCRIPTION OF EMBODIMENTS

Embodiments of the present invention are described in detail with reference to the drawings.

Embodiment 1

A robot system of Embodiment 1 positions a robot hand 102 at an imaging point offset from a teaching point before correction, in the depth of field direction of a stereo camera 103, and images a marker 105.

(Robot System)

Figure 1:
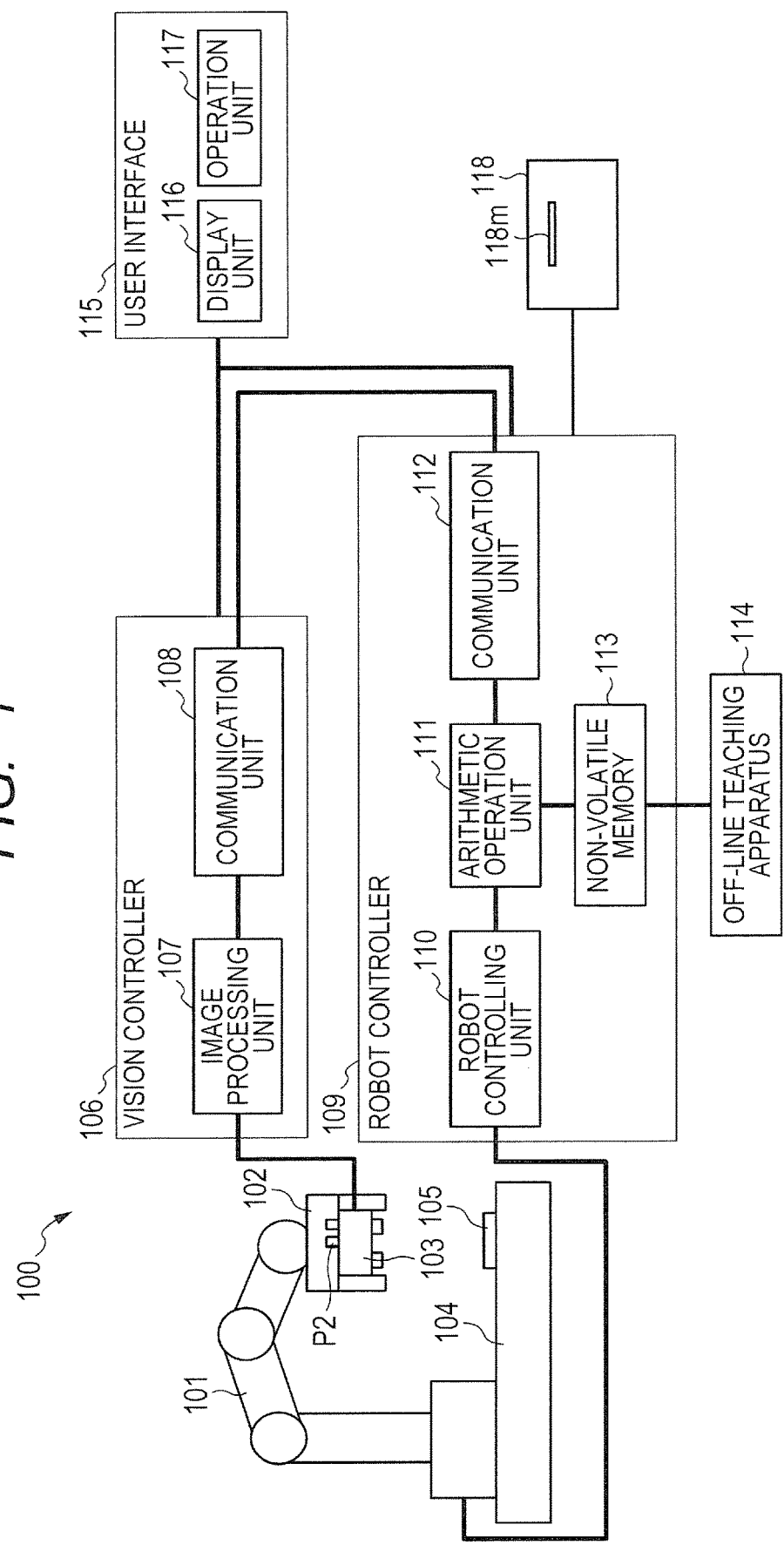
FIG. 1 is a diagram illustrating a configuration of a robot system.

FIG. 1 is a diagram illustrating a configuration of a robot system. As illustrated in FIG. 1, a robot system 100, which is an example of a robot apparatus, achieves multiple stages of assembling work through a robot arm 101 instead of manual assembling work. The robot system 100 uses a multi-joint (e.g., six-joint) robot arm 101 to perform a process of assembling a workpiece held on a working stage 104 of the robot system 100.

The robot arm 101, which is an example of a multi-joint robot arm, moves a robot hand 102, which is an example of a working unit. The robot hand 102 is attached to the robot arm 101 and serves as an end effector of the robot arm 101. The robot hand 102 is a grasping tool that includes multiple fingers (e.g., three fingers).

The working stage 104 supports an object to be processed using the robot hand 102. A robot controller 109, which is an example of a controlling unit, controls the robot arm 101.

(Stereo Camera)

Figure 2:
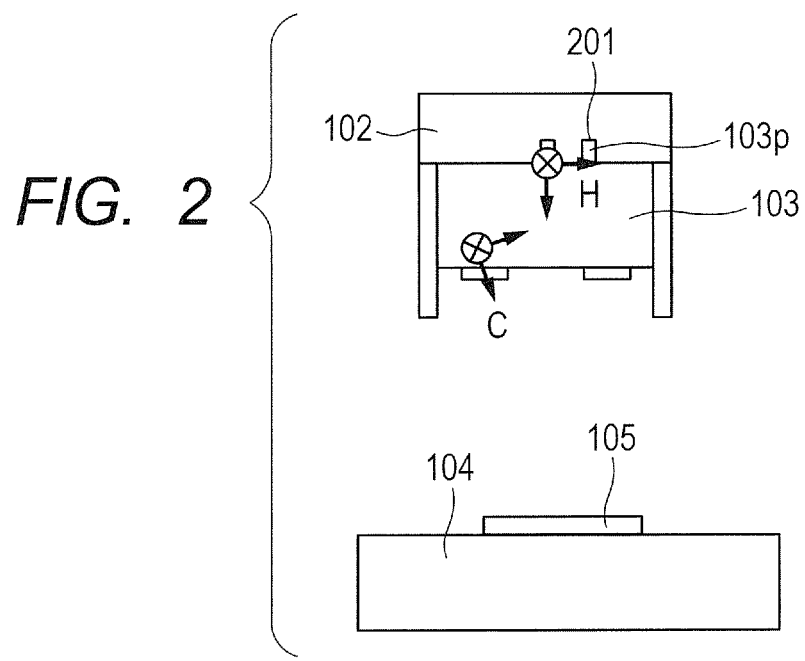
FIG. 2 is a diagram illustrating a robot hand that grasps a stereo camera.

FIG. 2 is a diagram illustrating a robot hand that grasps a stereo camera. As illustrated in FIG. 2, the stereo camera 103 is a three-dimensional visual sensor that includes two cameras. The stereo camera 103 is a three-dimensional visual sensor that adopts a passive stereo camera.

To automate the on-line teaching operation, the robot hand 102 is designed in conformity with specifications of grasping the stereo camera 103. Two pin holes 201 for positioning are formed on a seating surface of the robot hand 102. Two pins 103p are mounted on the undersurface of the stereo camera 103. Insertion of the pins 103p into the respective pin holes 201 allows the robot hand 102 and the stereo camera 103 to be accurately positioned to each other.

(Calibration of Hand Camera)

Figure 3:
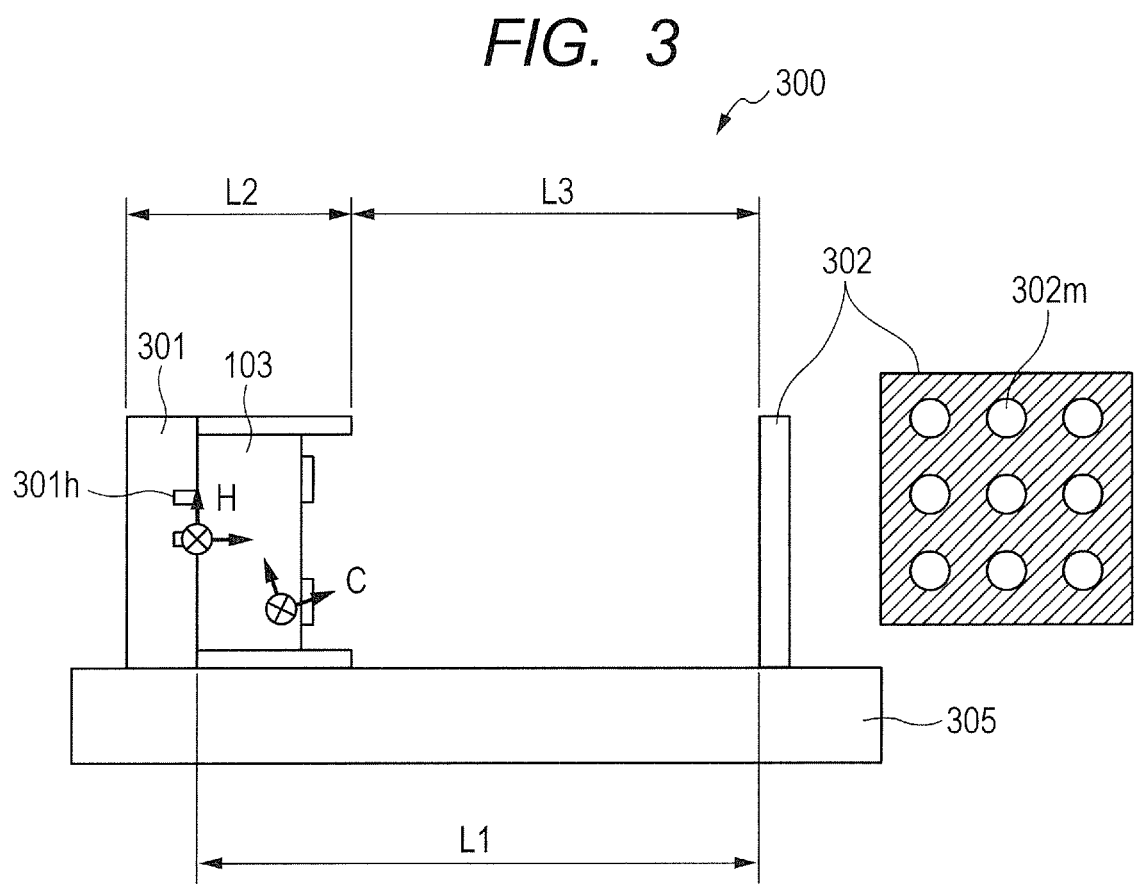
FIG. 3 is a diagram illustrating a hand camera calibrating apparatus.

FIG. 3 is a diagram illustrating a hand camera calibrating apparatus. As illustrated in FIG. 2, a coordinate system which has an origin at a pin hole 201 of the robot hand 102 and is fixed to the robot hand 102 is defined as a hand coordinate system H. Meanwhile, a coordinate system of position information output from the stereo camera 103 is defined as a camera coordinate system C.

A three-dimensional position measurement result obtained by applying image processing to an image taken by the stereo camera 103 indicates the position in the camera coordinate system C. The automated on-line teaching operation estimates the position of the robot hand 102 from the three-dimensional measurement result by the stereo camera 103. Thus, before automated on-line teaching, hand camera calibration is executed to obtain a hand-camera transformation matrix $^H T_C$ that represents the relative position and attitude between the hand coordinate system H and the camera coordinate system C. Here, T is a homogeneous transformation matrix. For example, it is assumed that a rotation matrix $^H R_C$ is between the coordinate system H and the coordinate system C and a translation matrix $^H t_C$ is between the coordinate system H and the coordinate system C. The homogeneous transformation matrix $^H T_C$ can be represented as follows.

$$^H T_C = \begin{pmatrix} ^H R_C & ^H t_C \\ 0 \quad 0 \quad 0 & 1 \end{pmatrix}$$

As illustrated in FIG. 3, a hand camera calibrating apparatus 300 is provided with a hand mock 301 that has pin holes having the same shapes as the pin holes 201 on the seating surface of the robot hand 102. A user mounts the stereo camera 103 on the hand mock 301.

The hand camera calibrating apparatus 300 is provided with a calibration marker jig 302 at a position accurately aligned to the hand mock 301. On the calibration marker jig 301, multiple indicators 302m measurable by the stereo camera 103 are provided in a pattern with white circles on a black background. The position of each indicator 302m in the hand coordinate system is mechanically, accurately configured. Meanwhile, when the indicators 302m are measured by the stereo camera 103, the positions of the indicators 302m in the camera coordinate system C are obtained. The hand-camera transformation matrix $^H T_C$ is obtained by solving an optimization calculation using the positions of the indicators 302m in the hand coordinate system and the measurement results of the indicators 302m. The hand camera calibrating apparatus 300 performs measurement without intervention of the robot system 100. Consequently, the apparatus can accurately calculate the hand-camera transformation matrix $^H T_C$.

(Marker)

Figure 4:
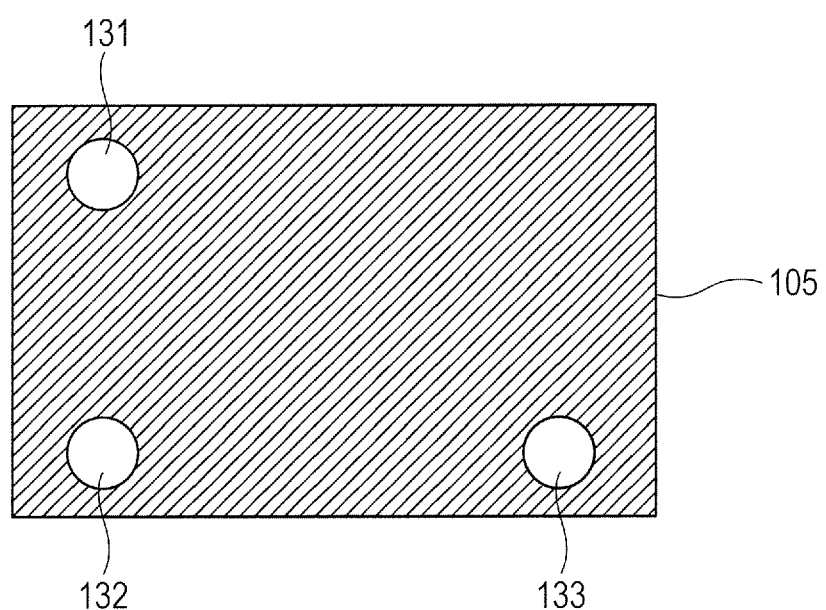
FIG. 4 is a diagram illustrating a marker.

FIG. 4 is a diagram illustrating a marker. As illustrated in FIG. 4, the marker 105 has the indicators 131, 132 and 133 provided with white circles on a plate with a black background by ink printing. The appropriate number of indicators on the marker 105 is at least three for one on-line teaching point because a three-dimensional marker coordinate system M is required to be defined. The larger the number of indicators, the more evenly the error of the three-dimensional position measurement is equalized. Consequently, the accuracy of the system is improved.

As illustrated in FIG. 1, in on-line teaching performed by operating the robot system 100, the marker 105 is provided on the working stage 104 of the robot system 100 in conformity with a target teaching point. The indicators 131, 132 and 133 are prepared on the marker 105, which is an example of the jig held and positioned on the working stage 104, which is an example of a support unit. The marker 105 is used instead of a workpiece, which is an object in actual work, in on-line teaching by the robot system 100.

The marker 105 is provided at a place where the relative position and attitude of the robot system 100 with respect to the workpiece in actual work can be accurately obtained. More specifically, the marker 105 is mounted directly on the working stage 104 where the workpiece is to be mounted in actual work.

The stereo camera 103 is grasped by the robot hand 102 during execution of on-line teaching. The stereo camera 103 is automatically positioned to the robot hand 102 in a process of being grasped by the robot hand 102. The stereo camera 103 images the indicators 131, 132 and 133 in a state of being positioned on the robot hand 102, and measures the three-dimensional position and attitude of the marker 105.

In the on-line teaching, a camera-marker transformation matrix $^C T_M$ is obtained by measuring the marker 105 using the stereo camera 103 grasped by the robot hand 102. A marker coordinate system M is defined by the marker 105. Based on the camera-marker transformation matrix $^{C}T_{M}$ and the hand-camera transformation matrix $^{H}T_{C}$, a matrix $^{H}T_{M}$ representing the relative position and attitude between the robot hand 102 and the marker 105 is obtained.

$$^{H}T_{M} = {^{H}T_{C}} \, {^{C}T_{M}}$$

(Vision Controller)

A vision controller 106 is a controller that includes an image processing unit 107 and a communication unit 108 and controls the stereo camera 103. The vision controller 106 includes a combination of a computer operating according to software, and accompanying hardware and a dedicated circuit.

The image processing unit 107 applies image processing to image data on a taken image of the marker 105, the data having been transmitted from the stereo camera 103. The image processing unit 107 three-dimensionally measures the center positions of the indicators 131, 132 and 133 of the marker 105. In Embodiment 1, the shapes of the indicators 131, 132 and 133 of the marker 105 are white circles. Consequently, a three-dimensional measurement process of the center position of white circles is described.

The image processing unit 107 focuses on the luminance levels of images taken by the two cameras of the stereo camera 103, sets an appropriate threshold allowing the indicators 131, 132 and 133 to be identified, and performs a binarizing process. Next, the image processing unit 107 applies elliptical approximation to the edge of a region with levels equal to or higher than the threshold in the taken image, and obtains the coordinates of the center of the ellipse. Next, the image processing unit 107 executes three-dimensional position measurement using the disparities of the indicators 131, 132 and 133 obtained from the centers of ellipses and a calibration result of the stereo camera 103, and obtains the positions of the indicators 131, 132 and 133 in the camera coordinate system C.

The image processing unit 107 multiplies each index position $^{C}P_{i}$ in the camera coordinate system C by the hand-camera transformation matrix $^{H}T_{C}$, and obtains each indicator position in the hand coordinate system H.

The communication unit 108 bi-directionally communicates with the robot controller 109. From the vision controller 106 to the robot controller 109, the positions of the indicators 131, 132 and 133 of the marker 105 in the hand coordinate system H three-dimensionally measured by the image processing unit 107 are transmitted.

A user interface 115 is an interface for allowing the user to control the robot. The user interface 115 includes a display unit 116 that displays a taken image and teaching result, and an operation unit 117 through which teaching point information is input. The display unit 116 is a display. The operation unit 117 is a mouse, keyboard and a teaching pendant.

(Robot Controller)

Figure 5:
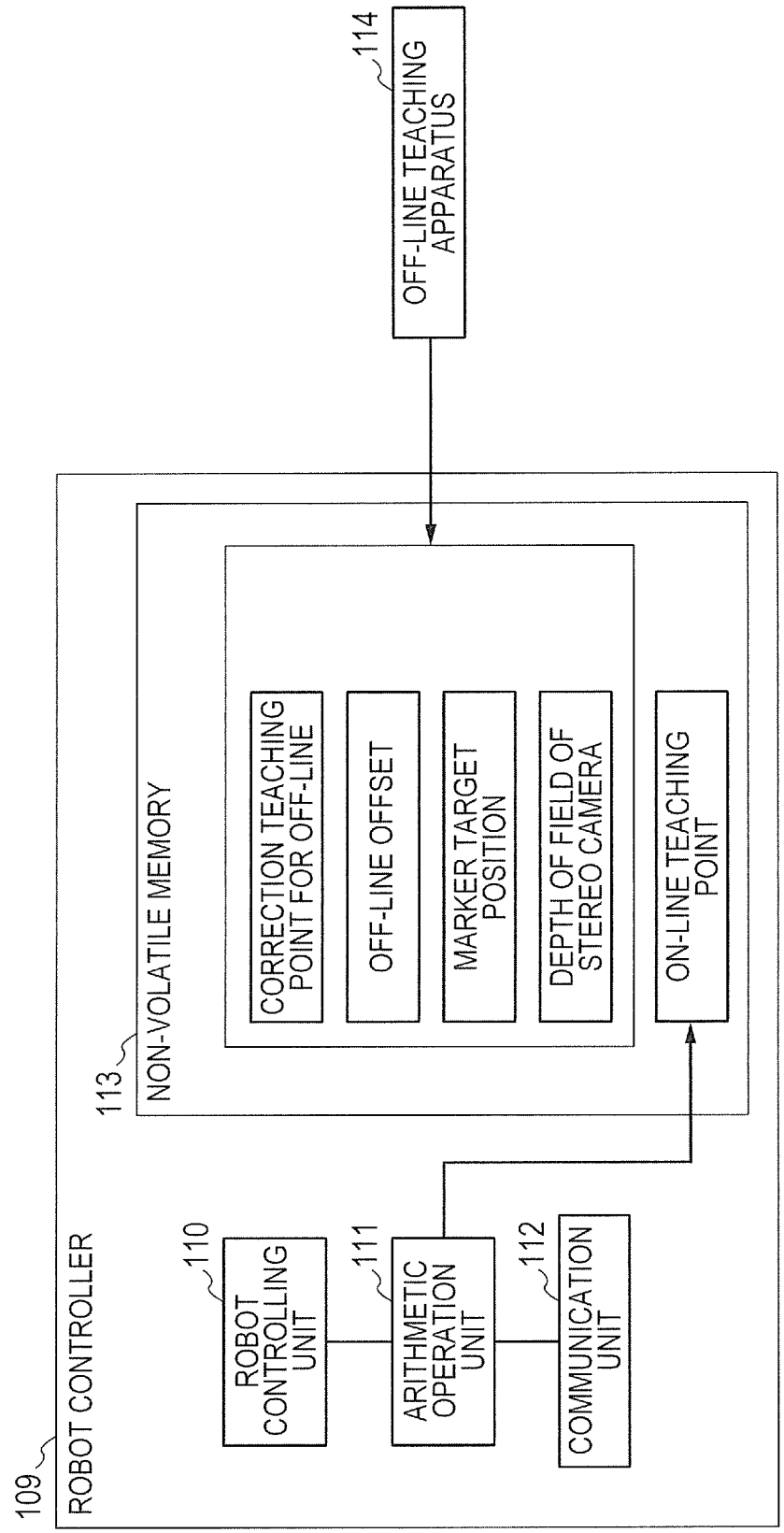
FIG. 5 is a diagram illustrating a robot controller.

FIG. 5 is a diagram illustrating a robot controller. FIG. 5 illustrates data written in a non-volatile memory 113. As illustrated in FIG. 1, the robot controller 109 is an apparatus that controls the robot arm 101 and the robot hand 102. The robot controller 109 includes a robot controlling unit 110, an arithmetic operation unit 111, a communication unit 112, and the non-volatile memory 113. The robot controller 109 includes a combination of a computer operating according to software, and accompanying hardware and a dedicated circuit.

The robot controlling unit 110 controls driving of the robot arm 101 and the robot hand 102. This unit transmits movement instructions to the robot arm 101 and the robot hand 102, thereby controlling the positions and attitudes of the robot arm 101 and the robot hand 102.

The arithmetic operation unit 111 calculates a movement quantity for the robot arm 101, using each indicator position of the marker 105 in the hand coordinate system H received from the vision controller 106 and the data in the non-volatile memory 113, and transmits the movement quantity to the robot controlling unit 110. A method of calculating the movement quantity is described later. After completion of the on-line teaching, the on-line teaching point is written into the non-volatile memory 113.

The communication unit 112 communicates with the vision controller 106. From the robot controller 109 to the vision controller 106, an image taking instruction for the stereo camera 103 is transmitted. In response to the image taking instruction, the stereo camera 103 executes an imaging process in imaging.

As illustrated in FIG. 5, information required for the arithmetic operation unit 111 to calculate the movement quantity, and data on the on-line teaching point are written into the non-volatile memory 113.

(Off-Line Teaching Apparatus)

As illustrated in FIG. 1, the robot system 100 achieves a process of assembling a workpiece by moving the robot arm 101 from a teaching point to another teaching point. To create the teaching point efficiently, off-line teaching that simulate the process using a computer is used.

As illustrated in FIG. 5, an off-line teaching apparatus 114 is a computer that simulates production stages using CAD (Computer Aided Design) software. The user operates the software on the off-line teaching apparatus 114, and creates a program for processing a workpiece (701 in FIGS. 6A and 6B) by the robot hand 102. Off-line teaching points, which are examples of virtual teaching points, are provided on important positions on the processing program and main points on the movement path.

Unfortunately, the off-line teaching points set by the off-line teaching apparatus 114 include various error factors, such as of the processing and assembling errors of the robot arm 101 and the workpiece. Consequently, if these points are used as they are, large position offsets occur. It is difficult to correct accurately the processing and assembling errors of the robot arm 101 and the workpiece and the difference between individual machines on the robot system 100 through off-line teaching.

Thus, as illustrated in FIG. 1, the robot system 100 causes the actual robot system 100 to measure the off-line teaching point set through the off-line teaching to measure the error, and corrects the point to obtain an on-line teaching point with the error having been eliminated.

Comparative Examples

In Comparative Example 1, pins are attached onto the processing object and the robot hand 102, and the robot arm 101 is manually operated to allow the offsets in relative position and attitude between the pair of pins to be within a reference, thereby correcting the off-line teaching point to the on-line teaching point.

However, the on-line teaching using a jig in Comparative Example 1 requires enormous working time, which reduces the operation rate of the robot system in a factory.

In Comparative Example 2, as described in PTL 1, the marker is provided on the processing object, and the marker position is measured through a three-dimensional visual sensor mounted on the working unit of the robot arm. Based on a measurement result on the marker position through the three-dimensional visual sensor, a three-dimensional correction quantity for moving the off-line teaching point to the on-line teaching point is obtained.

Comparative Example 2 assumes that the working unit of the robot arm operates at the off-line teaching point during on-line teaching. However, the marker is not necessarily always present in the imageable range of the three-dimensional visual sensor mounted on the working unit in the depth of field direction when the working unit of the robot arm is positioned at the off-line teaching point. That is, the marker on the processing object cannot necessarily be imaged while the three-dimensional visual sensor is in focus when the robot arm is at a working position. Thus, there is a case where the off-line teaching point cannot be accurately corrected to the on-line teaching point using the three-dimensional visual sensor at the working unit of the robot arm being at the working position.

To address this, in Embodiment 1, the three-dimensional visual sensor is positioned at the correction teaching point for off-line that is offset from the off-line teaching point in the depth of field direction during on-line teaching, and the marker 105 is imaged.

(Correction Teaching Point for Off-Line)

Figures 6A, 6B:
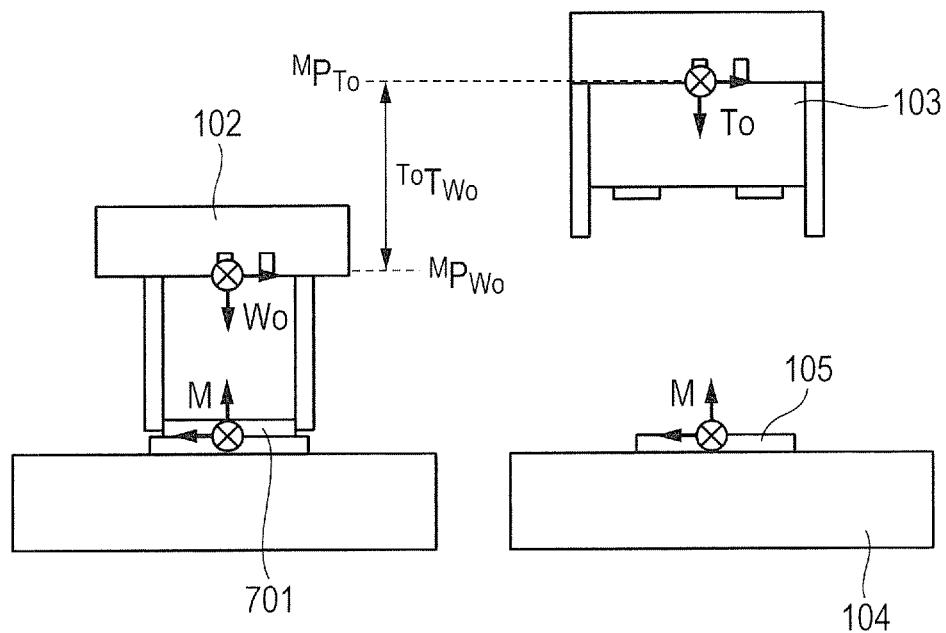
FIGS. 6A and 6B are diagrams illustrating a correction teaching point for off-line.

FIGS. 6A and 6B are diagrams illustrating a correction teaching point for off-line. FIG. 6A illustrates the off-line teaching point. FIG. 6B illustrates the correction teaching point for off-line. Here, the off-line offset $^{To}T_{Wo}$ is in a vector representation. The off-line teaching point $^{M}P_{Wo}$, the correction teaching point for off-line $^{M}P_{To}$, the correction teaching point for on-line $^{M}P_{Tr}$ and the correction teaching point for on-line $^{M}P_{Wr}$ are in coordinate representation. Here, the matrix P is of a homogeneous coordinate system where the origin of the coordinate system of the lower right index viewed from the coordinate system of the upper left index, and the positions of three points defining the X and Y axes are combined. For example, it is assumed that the origin (Xo, Yo, Zo) is of the coordinate system Wo viewed from the marker coordinate system, and a point (Xx, Yx, Zx) is on the X-axis and a point (Xy, Yy, Zy) is on the Y-axis, and the off-line teaching point $^{M}P_{Wo}$ can be represented as follows.

$$^{M}P_{Wo} = \begin{pmatrix} Xo & Xx & Xy \\ Yo & Yx & Yy \\ Zo & Zx & Zy \\ 1 & 1 & 1 \end{pmatrix}$$

As illustrated in 6A, the off-line teaching apparatus 114 simulates the production stages so that the robot hand 102 can grasp the workpiece 701 at the off-line teaching point $^{M}P_{Wo}$. As illustrated in FIG. 1, in the on-line teaching performed by the actual machine of the robot system 100, the marker 105 disposed in conformity with the workpiece 701 is imaged by the stereo camera 103 grasped by the robot hand 102.

As illustrated in FIG. 6B, in the on-line teaching, the robot hand 102 grasping the stereo camera 103 is positioned at the correction teaching point for off-line $^{M}P_{To}$ apart from the off-line teaching point $^{M}P_{Wo}$ by the offset $^{To}T_{Wo}$, and images the marker 105.

While the robot hand 102 is positioned at the correction teaching point for off-line $^{M}P_{To}$, the indicators 131, 132 and 133 are in the measurable range of the stereo camera 103. However, while the robot hand 102 is positioned at the off-line teaching point $^{M}P_{Wo}$, the indicators 131, 132 and 133 are out of the measurable range of the stereo camera 103. That is, when the robot hand 102 is positioned at the correction teaching point for off-line $^{M}P_{To}$, the measurement accuracies of the indicators 131, 132 and 133 by the stereo camera 103 are higher than the accuracies in the case where the robot hand 102 is positioned at the off-line teaching point $^{M}P_{Wo}$.

The off-line teaching apparatus 114, which is an example of an imaging point creating apparatus, creates the correction teaching point for off-line $^{M}P_{To}$, which is an example of an imaging point to be supplied to the robot system 100. The off-line teaching apparatus 114 determines whether or not the indicators are in the measurable range of the stereo camera 103 when the robot hand 102 is positioned at the off-line teaching point $^{M}P_{Wo}$ in a process of determining in determining. Subsequently, when the indicators are in the measurable range in an imaging point setting process in imaging point setting, the off-line teaching point $^{M}P_{Wo}$ is set as it is as the correction teaching point for off-line $^{M}P_{To}$. On the contrary, when the indicators are out of the measurable range, the position offset from the off-line teaching point $^{M}P_{Wo}$ in the depth of field direction of the stereo camera 103 is set as the correction teaching point for off-line $^{M}P_{To}$, which is an example of the imaging point.

(Setting Control of Correction Teaching Point for Off-Line)

Figure 7:
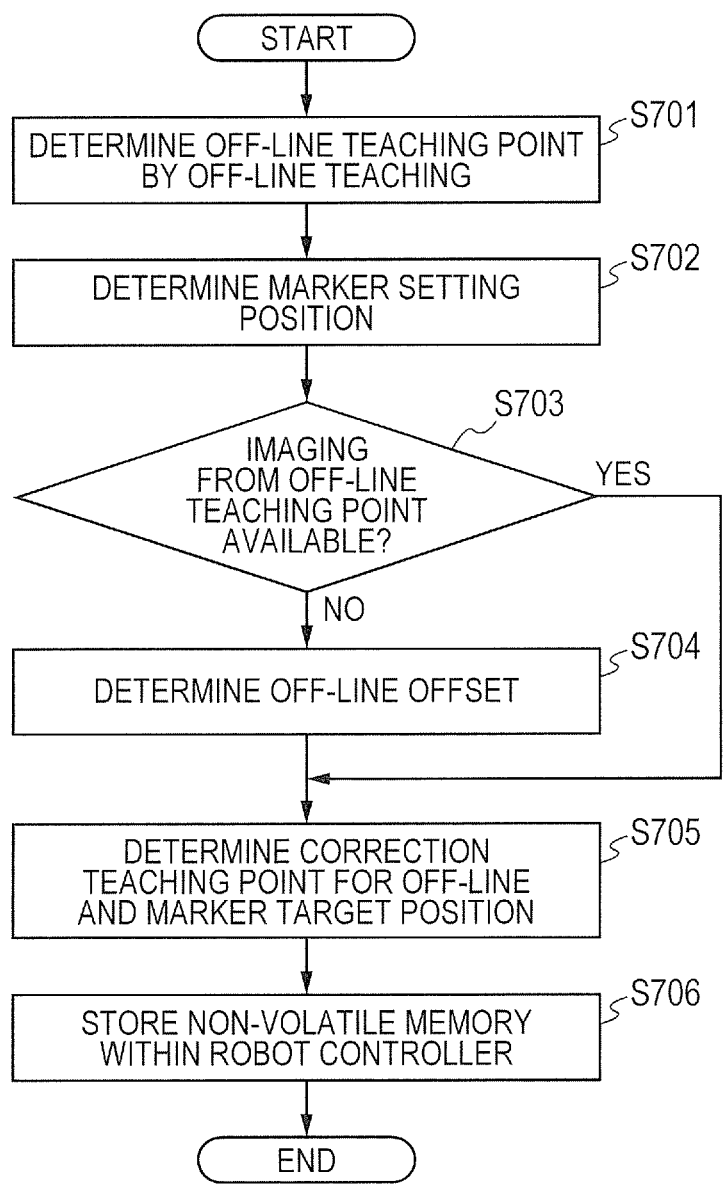
FIG. 7 is a flowchart of controlling setting of the correction teaching point for off-line.

FIG. 7 is a flowchart of controlling setting of the correction teaching point for off-line. As illustrated in FIG. 7, the off-line teaching apparatus 114 determines the off-line teaching point at a certain number of timings in the processing program created in the off-line teaching (S701). Design data on the processing object, such as a workpiece, and data representing the relative position and attitude of the robot hand 102 and the workpiece are used to create the off-line teaching point.

The off-line teaching apparatus 114 determines the setting position of the marker 105 in the robot system 100 (S702). In Embodiment 1, as illustrated in FIG. 6B, the workpiece 701 is replaced, and the marker 105 is mounted on the working stage 104. When the robot hand 102 is at the off-line teaching point $^{M}P_{Wo}$, the off-line teaching apparatus 114 determines whether imaging of the marker 105 is available in the depth of field of the stereo camera 103 or not (S703).

When the imaging of the marker 105 in the depth of field is not available (No in S703), the off-line teaching apparatus 114 calculates the off-line offset $^{To}T_{Wo}$, which is the movement quantity from the off-line teaching point $^{M}P_{Wo}$ to the position imageable in the depth of field (S704). The off-line teaching apparatus 114 sets the position apart from the off-line teaching point $^{M}P_{Wo}$ by the off-line offset $^{To}T_{Wo}$ as the correction teaching point for off-line $^{M}P_{To}$ (S705).

When the imaging of the marker 105 is available (Yes in S703), the off-line teaching apparatus 114 sets the correction teaching point for off-line $^{M}P_{To}$, which is the same as the off-line teaching point $^{M}P_{Wo}$ (S705). The off-line teaching apparatus 114 stores the correction teaching point for off-line $^{M}P_{To}$ and the off-line offset $^{To}T_{Wo}$ in the non-volatile memory 113 in the robot controller 109 (S706). The off-line teaching apparatus 114 writes, in the non-volatile memory 113, data items including the marker target position, which is each indicator position of the marker 105 in the hand coordinate system, and the depth of field of the stereo camera 103, when the robot hand 102 is at the correction teaching point for off-line.

Such operations are repeated at the multiple off-line teaching points set in the processing program in the simulated production stages.

(Correction Teaching Point for On-Line)

FIGS. 8A and 8B are diagrams illustrating a correction teaching point for on-line. FIG. 8A illustrates the correction teaching point for on-line. FIG. 8B illustrates the on-line teaching point.

The robot system 100 causes the stereo camera 103 to measure the marker 105 at the correction teaching point for off-line, corrects the correction teaching point for off-line to the correction teaching point for on-line and then corrects the off-line teaching point to the on-line teaching point. Consequently, even in the case where teaching is performed at a position different from the position where the robot hand 102 operates, the correction teaching point for off-line $^{M}P_{To}$ with a low accuracy to the on-line teaching point $^{M}P_{Wr}$ with a high accuracy.

As illustrated in FIG. 6A, the off-line teaching point $^{M}P_{Wo}$ set in the off-line teaching is data representing "the position and attitude of the robot hand 102 during execution of the process by the robot arm 101" set in the robot controller 109.

As illustrated in FIG. 8A, the correction teaching point for on-line $^{M}P_{Tr}$ is position and attitude data on the robot hand 102 that is obtained by adding the three-dimensional correction quantity measured using the stereo camera 103 in the on-line teaching to the correction teaching point for off-line $^{M}P_{To}$.

As illustrated in FIG. 8B, the on-line offset $^{Tr}T_{Wr}$ is position and attitude data for obtaining the on-line teaching point $^{M}P_{Wr}$ from the correction teaching point for on-line $^{M}P_{Tr}$.

Embodiment 1 assumes that the on-line offset $^{Tr}T_{Wr}$ has the same value as the off-line offset $^{To}T_{Wo}$ has. The on-line teaching point $^{M}P_{Wr}$ is calculated by adding the on-line offset $^{Tr}T_{Wr}$ to the correction teaching point for on-line $^{M}P_{Tr}$.

(Setting Control of Correction Teaching Point for On-Line)

FIG. 9 is a flowchart of controlling setting of the on-line teaching point of Embodiment 1. As illustrated in FIG. 9, in the case where the stereo camera 103 is of a detachable type, the user causes the robot hand 102 to grasp the stereo camera 103 (S901). When the user presses a start button for on-line teaching in the operation unit 117, the robot controller 109 automatically executes the on-line teaching (S902 to S907).

The robot controller 109 reads the correction teaching point for off-line from the non-volatile memory 113 into the arithmetic operation unit 111, and performs a robot arm control process in robot arm controlling. In the robot arm control process, the robot arm 101 is moved to the correction teaching point for off-line $^{M}P_{To}$ (S902).

The robot controller 109 transmits an image taking instruction to the vision controller 106 via the communication unit 112, to perform the imaging (process). The vision controller 106 transmits the image taking instruction to the stereo camera 103, and obtains a taken image of the marker 105. The image processing unit 107 applies image processing to the taken image, and measures the present marker position. The vision controller 106 transmits a measurement result to the robot controller 109 via the communication unit 108 (S903).

The robot controller 109 measures the position offset quantity of the present marker position from the received present marker position and the marker target position in the non-volatile memory 113, and moves the robot hand 102 so that the position offset quantity can approach zero (S904). That is, a correction process in the collecting controls the robot arm 101 based on the imaging results of the indicators 131, 132 and 133 to move the robot hand 102 to the target imaging point. Consequently, the robot hand 102 is positioned at the correction teaching point for on-line $^{M}P_{Tr}$, and the robot controller 109 obtains data on the correction teaching point for on-line $^{M}P_{Tr}$ based on the movement result of the robot hand 102.

The robot controller 109 reads the off-line offset $^{To}T_{Wo}$ from the non-volatile memory 113, and determines whether or not the off-line offset $^{To}T_{Wo}$ is set at the correction teaching point for off-line $^{M}P_{To}$ or not (S905). When the off-line offset $^{To}T_{Wo}$ is not set (No in S905), the robot controller 109 registers the correction teaching point for on-line $^{M}P_{Tr}$ as it is as the on-line teaching point $^{M}P_{Wr}$ (S907).

When the off-line offset $^{To}T_{Wo}$ is set (Yes in S905), the robot controller 109 registers, as the on-line teaching point $^{M}P_{Wr}$, a position obtained by subtracting the off-line offset $^{To}T_{Wo}$ from the correction teaching point for on-line $^{M}P_{Tr}$ (S906, S907).

Such operations are repeated at the multiple off-line teaching points $^{M}P_{To}$ set in simulated production stages, thereby correcting the points to the respective on-line teaching points $^{M}P_{Wr}$ corresponding thereto.

As illustrated in FIG. 1, in a memory card 118m, which is an example of a recording medium inserted into a card reader 118, a program is recorded that causes the computer to execute the teaching point correcting method for the robot system 100 illustrated in FIG. 9.

(Calculation of Movement Quantity of Robot Hand)

The robot controller 109 reads the marker target position from the non-volatile memory 113. Embodiment 1 assumes the number of points of the indicators of the marker 105 is three. Accordingly, a target marker coordinate system Mo is set using information on the three marker target positions. Next, the present marker coordinate system Mn is set from the present marker positions information. The robot controller 109 calculates the relative position and attitude between the target marker coordinate system Mo and the present marker coordinate system Mn, calculates the movement quantity of the robot arm 101, and moves the robot arm 101 by the calculated movement quantity. The position and attitude of the moved robot hand 102 after the movement is referred to as the correction teaching point for on-line $^{M}P_{Tr}$. The off-line offset $^{To}T_{Wo}$ and the correction teaching point for on-line $^{M}P_{Tr}$ are assumed, and the on-line teaching point $^{M}P_{Wr}$ can be obtained by the following Expression (1).

$$^{M}P_{Wr} = {^{To}T_{Wo}} \, ^{M}P_{Tr} \qquad \text{Expression (1)}$$

In Expression 1, T denotes a homogeneous transformation matrix, the upper left index is the coordinate system before movement, and the lower right index is the coordinate system after movement.

(Advantageous Effects of Embodiment 1)

In Embodiment 1, the marker 105 is imaged at the correction teaching point for off-line. Consequently, even with a limitation on the depth of field of the stereo camera 103, the off-line teaching point of the robot hand 102 can be accurately corrected.

In Embodiment 1, the stereo camera 103 images the indicators 131, 132 and 133 in a state of being positioned on the robot hand 102, and measures the three-dimensional position and attitude of the marker 105. Consequently, the position error and attitude error of the robot hand 102 at the on-line teaching point can be corrected at the same time.

In Embodiment 1, the robot hand 102 is positioned at the off-line teaching point that is offset from the indicators 131, 132 and 133 in the depth of field direction of the stereo camera 103. Consequently, the range where the stereo camera 103 can be positioned at the robot hand 102 is increased, which allows a simple attachment method that achieves gripping by the robot hand 102 and detaching in the case without necessity, as in Embodiment 1.

In Embodiment 1, while the robot hand 102 is positioned at the correction teaching point for off-line, the indicators are imaged by the stereo camera 103. Consequently, even with a limitation on the imageable range in the depth of field direction of the stereo camera 103, the positions of the indicators can be accurately measured.

In Embodiment 1, the robot arm 101 is controlled based on the imaging results of the indicators 131, 132 and 133 to move the robot hand 102 to the target imaging point. Consequently, the marker 105 can further be imaged at the target imaging point, and it can be confirmed that the target imaging point is accurate.

In Embodiment 1, offset is achieved in a defection direction away from the off-line teaching point to the correction teaching point for off-line. The corrected teaching point is obtained by adding, to the target imaging point, an approaching vector having the sense in the direction opposite to that of the defection vector and having the same magnitude as the defection vector. Consequently, there is no need to move actually the robot hand 102 grasping the stereo camera 103 to the on-line teaching point.

In Embodiment 1, when the robot hand 102 is positioned at the correction teaching point for off-line, the measurement accuracies of the indicators by the stereo camera 103 are higher than the accuracies in the case where the robot hand 102 is positioned at the off-line teaching point. Consequently, the position offset quantity of the off-line teaching point or the correction teaching point for off-line can be accurately obtained. The robot hand 102 can be moved accurately from the correction teaching point for off-line, which serves as the starting point, to the correction teaching point for on-line.

According to Embodiment 1, while the robot hand 102 is positioned at the correction teaching point for off-line, the indicators are in the measurable range of the stereo camera 103. However, while the robot hand 102 is positioned at the off-line teaching point, the indicators are out of the measurable range of the stereo camera 103. Consequently, the indicators can be securely measured by the stereo camera 103, and the on-line teaching point can be highly reliably and securely set.

In Embodiment 1, the stereo camera 103 has already been positioned by the robot hand 102 in a stage of being grasped by the robot hand 102. Consequently, the positioning negates the need to adjust the position of the stereo camera 103 after grasping.

In Embodiment 1, the indicators are provided on the marker 105 that is positioned and held on the working stage 104. Consequently, the marker 105 can be usually detached and the workpiece can be processed in a compact manner. Contaminations on the marker 105 accompanying workpiece processing can be prevented.

Embodiment 2

In Embodiment 2, the on-line teaching point is corrected again by performing subsidiary imaging with the starting point at the correction teaching point for on-line. The configuration and control other than those of the robot system and the subsidiary imaging are the same as the configuration and control of Embodiment 1. Consequently, components in FIGS. 10A to 10C common to those of Embodiment 1 are assigned signs common to those of FIG. 1, and redundant description is omitted.

(Inclination of On-Line Offset)

Figure 10A:
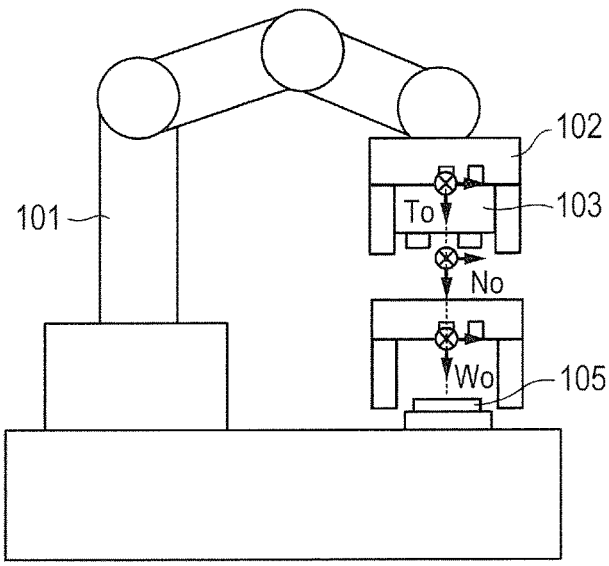
FIGS. 10A, 10B and 10C are diagrams illustrating the inclination of an on-line offset.
Figure 10B:
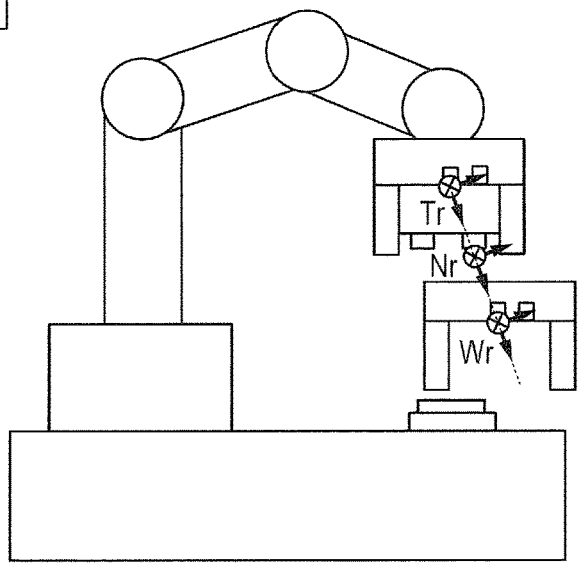
Figure 10C:
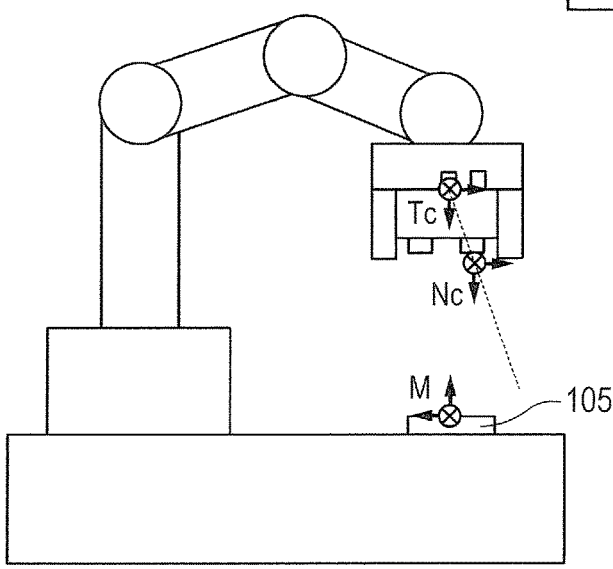

FIGS. 10A to 10C are diagrams illustrating the inclination of an on-line offset. FIG. 10A illustrates off-line teaching. FIG. 10B illustrates on-line teaching. FIG. 10C illustrates correction of on-line offset.

As illustrated in FIGS. 6A, 6B, 8A and 8B, Embodiment 1 assumes that the off-line offset $^{To}T_{Wo}$, which is an example of a defection vector, is the same as the on-line offset $^{Tr}T_{Wr}$, which is an example of an approaching vector. Here, when the off-line offset $^{To}T_{Wo}$ is short, it can be assumed that the off-line offset $^{To}T_{Wo}$ is the same as the on-line offset $^{Tr}T_{Wr}$. On the contrary, when this offset is long, the relative difference of the angles of both the offsets is unignorable. To address this, in Embodiment 2, on-line teaching is performed so as to remove the effect of the difference in angle between the off-line offset $^{To}T_{Wo}$ and the on-line offset $^{Tr}T_{Wr}$.

As illustrated in FIGS. 10A and 10B, the coordinate systems T, N and W are hand coordinate systems at the teaching point for correction, during movement of the stereo camera 103 within the depth of field, and at the teaching point obtained by adding the offset to the teaching point for correction, respectively.

FIG. 10A is a diagram illustrating a state where the off-line offset is applied during the off-line teaching. Also in Embodiment 2, the off-line teaching point $^{M}P_{Wo}$ is set according to procedures analogous to those in Embodiment 1, and the off-line offset $^{To}T_{Wo}$ is added to the off-line teaching point $^{M}P_{Wo}$ to set the correction teaching point for off-line $^{M}P_{To}$.

The robot hand 102 is then positioned at the correction teaching point for off-line $^{M}P_{To}$, the marker 105 is imaged by the stereo camera 103, and the position offset quantity of the marker 105 is measured. The robot hand 102 is then moved from the correction teaching point for off-line $^{M}P_{To}$ to the correction teaching point for on-line $^{M}P_{Tr}$ to allow the position offset quantity to approach zero.

FIG. 10B illustrates a state where in the on-line teaching, the robot controller 109 applies the on-line offset before correction to the correction teaching point for on-line. When the robot hand 102 is positioned at the correction teaching point for on-line $^{M}P_{Tr}$ and the marker 105 is imaged by the stereo camera 103, the position offset quantity of the marker 105 has a value close to zero.

However, even if the position offset has a value close to zero at the correction teaching point for on-line $^{M}P_{Tr}$, the position offset does not necessarily have a value close to zero at the on-line teaching point $^{M}P_{Wr}$ moved from the correction teaching point for on-line $^{M}P_{Tr}$ by the on-line offset $^{Tr}T_{Wr}$.

It is assumed that the on-line offset $^{Tr}T_{Wr}$ that is equal to the off-line offset $^{To}T_{Wo}$ is applied to the correction teaching point for on-line $^{M}P_{Tr}$ by the robot controller 109. Here, there is a possibility that link parameter calculation errors due to the processing error and deflection of the robot arm 101 are accumulated and the robot controller 109 applies the on-line offset $^{Tr}T_{Wr}$ inclined from the off-line offset $^{To}T_{Wo}$. When the direction of the on-line offset $^{Tr}T_{Wr}$ is different from the direction of the off-line offset $^{To}T_{Wo}$, the on-line teaching point $^{M}P_{Wr}$ is largely different from the off-line teaching point $^{M}P_{Wo}$.

To address this, in Embodiment 2, the marker 105 is subsidiarily imaged in the depth of field of the stereo camera 103 with the robot arm 101 having been positioned at the correction teaching point for on-line $^{M}P_{Tr}$ and moved in the direction to the on-line offset $^{Tr}T_{Wr}$.

In the subsidiary imaging, the robot hand 102 is positioned at a subsidiary imaging point that is apart from the correction teaching point for on-line $^{M}P_{Tr}$ in the direction of the on-line offset $^{Tr}T_{Wr}$ by an offset smaller than the on-line offset $^{Tr}T_{Wr}$. In the state where the robot hand 102 is positioned at the subsidiary imaging point, the indicators 131, 132 and 133 are imaged by the stereo camera 103.

The robot controller 109 corrects the angular offset between the off-line offset $^{To}T_{Wo}$ and the on-line offset $^{Tr}T_{Wr}$ based on the taken images of the indicators 131, 132 and 133 at the subsidiary imaging point. The correction teaching point for on-line is corrected to the on-line teaching point using the corrected on-line offset.

(Control of in Embodiment 2)

Figure 11:
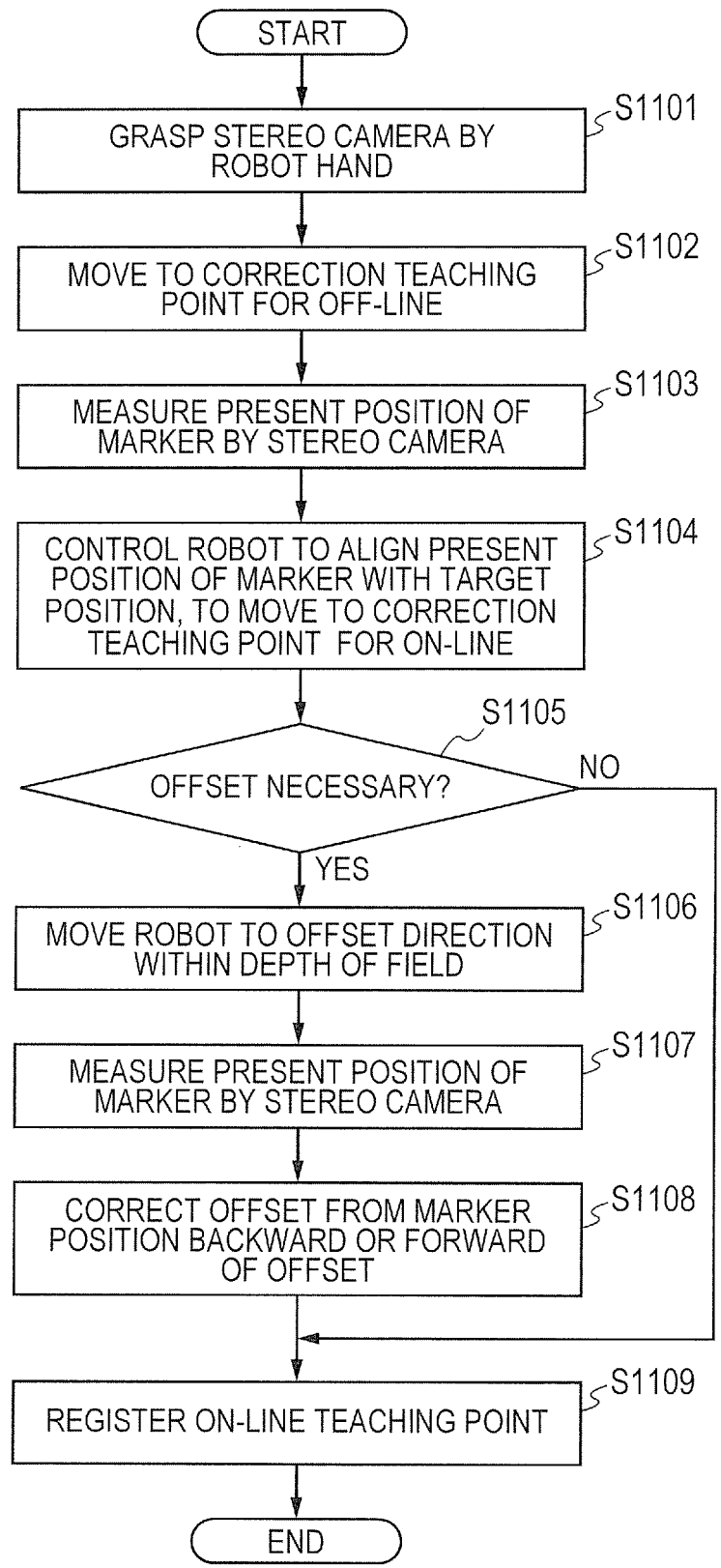
FIG. 11 is a flowchart of controlling setting of the on-line teaching point in Embodiment 2.

FIG. 11 is a flowchart of controlling setting of the on-line teaching point in Embodiment 2. In FIG. 11, steps S1101 to S1105 are the same as steps S901 to S905 of Embodiment 1 illustrated in FIG. 9. Consequently, the detailed description is omitted.

The user causes the robot hand 102 to grasp the stereo camera 103 and starts the on-line teaching (S1101).

The robot controller 109 moves the robot arm 101 that grasps the stereo camera 103 to the correction teaching point for off-line $^{M}P_{To}$ (S1102).

The robot controller 109 obtains a taken image of the marker 105 through the stereo camera 103, and the image processing unit 107 measures the marker position (S1103).

The robot controller 109 moves the robot arm 101, and corrects the correction teaching point for off-line $^{M}P_{To}$ to the correction teaching point for on-line $^{M}P_{Tr}$ (S1104).

When the off-line offset $^{To}T_{Wo}$ is not set at the correction teaching point for off-line $^{M}P_{To}$ (No in S1105), the robot controller 109 registers the correction teaching point for on-line $^{M}P_{Tr}$ as it is as the on-line teaching point $^{M}P_{Wr}$ (S1109).

When the off-line offset $^{To}T_{Wo}$ is set at the correction teaching point for off-line $^{M}P_{To}$ (Yes in S1105), the robot controller 109 moves the robot arm 101 in the direction of the on-line offset $^{Tr}T_{Wr}$ (S1106).

The robot controller 109 images the marker 105 again at an imaging point where the marker 105 is in the depth of field of the stereo camera 103, and measures the relative relationship $^{Nc}T_{M}$ between the marker 105 and the robot hand 102 (S1107).

The robot controller 109 calculates the corrected on-line offset $^{Tr}T_{Wo}$ using the relative relationship $^{Nc}T_{M}$ (S1108). The corrected on-line offset $^{Tr}T_{Wo}$ is an offset in consideration of the position offset of the correction teaching point for on-line $^{M}P_{Tr}$.

The robot controller 109 calculates the corrected on-line teaching point $^{M}P_{Wr}$, using the correction teaching point for on-line $^{M}P_{Tr}$ and the corrected on-line offset $^{Tr}T_{Wo}$, and stores the calculated point in the non-volatile memory 113 (S1109).

$$^{M}P_{Wr}=^{Tr}T_{Wo}{}^{M}P_{Tr}(\cong{}^{M}P_{Wo})$$

Such operations are repeated at the correction multiple teaching points for off-line in the processing program for the robot arm 101 to correct the multiple off-line teaching points to the respective on-line teaching points corresponding thereto.

(Correction of On-Line Offset)

FIG. 10C is a diagram illustrating the hand coordinate system measured using the stereo camera 103, the marker 105 and the hand-camera transformation matrix $^{H}T_{C}$ when the on-line offset is applied. As illustrated in FIG. 2, the transformation matrix $^{H}T_{C}$ is a matrix from the camera coordinate system C to the hand coordinate system H defined by the pin hole 201 on the hand seating surface.

One example of the method of correcting the on-line offset is described using mathematical expressions. The correction teaching point for off-line is a point $^{M}P_{To}$, and the correction teaching point for on-line is a point $^{M}P_{Tr}$. According to step S1104, $^{M}P_{To}\cong{}^{M}P_{Tr}$. The off-line offset $^{To}T_{Wo}$ is obtained from the off-line teaching apparatus 114. The on-line offset before correction is an offset $^{Tr}T_{Wr}$.

Through use of these values, the off-line teaching point $^{M}P_{Wo}$ and the on-line teaching point $^{M}P_{Wr}$ before correction can be represented in the following expressions.

$$^{M}P_{Wo}=^{To}T_{Wo}{}^{M}P_{To} \quad {}^{M}P_{Wr}=^{Tr}T_{Wr}{}^{M}P_{Tr}$$

Ideally, after application of the on-line offset, the robot hand 102 is brought to the off-line teaching point $^{M}P_{Wo}$. Consequently, the on-line offset $^{Tr}T_{Wr}$ is required to be corrected to the corrected on-line offset $^{Tr}T_{Wo}$. The corrected on-line offset $^{Tr}T_{Wo}$ can be transformed as represented in Expression (2).

$$^{Tr}T_{Wo}=^{Tr}T_{To}{}^{To}T_{Wo} \quad \text{Expression (2)}$$

The off-line offset $^{To}T_{Wo}$ has already been known. Consequently, to correct the on-line offset, $^{Tr}T_{To}$ is required to be obtained. The calculation method is described.

It is assumed that the movement quantity $^{Tr}T_{Nr}$ is of the robot hand 102 in step S1106 in FIG. 11, and the relative relationship $^{Nc}T_{M}$ is between the marker 105 and the robot hand 102 and has been measured in step S1107. $^{Nc}T_{M}$ can be transformed as represented in Expression (3).

$$^{Nc}T_{M}=^{Nc}T_{Tc}{}^{Tc}T_{M} \quad \text{Expression (3)}$$

As to Expression (3), the positional relationship $^{Tc}T_{M}$ between the robot hand 102 and the marker 105 at the correction teaching point for on-line $P_{Tr}$ has already been known in step S1104. Based on Expression (3), the relative relationship $^{Nc}T_{Tc}$ between the robot hand 102 before and after being subjected to the on-line offset is obtained as represented in Expression (4).

$$^{Nc}T_{Tc}=^{Nc}T_{M}(^{Tc}T_{M})^{-1} \quad \text{Expression (4)}$$

The translational movement component $^{Tc}t_{Nc}$ of the relative relationship $^{Nc}T_{Tc}$ of Expression (4) is obtained. The hand coordinate system Tc measured by the stereo camera 103 at the correction teaching point for on-line is substantially identical to the hand coordinate system To at the correction teaching point for off-line. The origins of the coordinate systems Nc and Nr are substantially identical to each other. Consequently, $^{Tc}t_{Nc}\cong{}^{To}t_{Nr}$. This $^{To}t_{Nr}$ can be transformed as represented in Expression (5).

$$^{To}t_{Nr}=^{To}T_{Tr}{}^{Tr}t_{Nr}=^{To}T_{Tr}{}^{To}t_{No} \quad \text{Expression (5)}$$

It is assumed that the position of the robot hand 102 linearly transitions with respect to the offset length when the on-line offset is applied, and $^{Tr}t_{Nr}\cong{}^{To}t_{No}$ is used. It is assumed that every translational movement component $^{To}T_{Tr}$ is zero. Only three variables that are rotational components then remain. Consequently, Expression (5) can be solved. $^{Tr}T_{To}$ is obtained by solving the expression. The obtained $^{Tr}T_{To}$ is substituted into Expression (2), which can calculate the corrected on-line offset $^{Tr}T_{Wo}$ (S1108).

Subsequently, the corrected on-line teaching point $^{M}P_{Wr}=^{Nc}T_{M}(\cong{}^{M}P_{Wo})$ can be calculated using the correction teaching point for on-line $^{M}P_{Tr}$ and the corrected on-line offset $^{Tr}T_{Wo}$ (S1109).

The coordinates of one on-line teaching point $^{M}P_{Wr}$ are thus calculated. In the case of multiple teaching points in the processing program for the robot arm 101, similar operations are performed at all the teaching points.

In Embodiment 2, the subsidiary imaging is performed at only one point in the depth of field of the stereo camera 103. Alternatively, the subsidiary imaging may be performed at multiple points in the depth of field to correct the on-line teaching point. Consequently, the errors, such as stereo measurement errors, are equalized, thereby allowing the on-line teaching point to be corrected more accurately.

In this case, Expression (5) may be calculated every time of movement of one point in the depth of field of the robot hand 102, six-degree-of-freedom variables of $^{To}T_{Tr}$ may be obtained according to optimization calculation so that the difference between the left and right sides of Expression (5) can be zero. By substituting the variables into Expression (2), the corrected on-line offset can be calculated.

(Advantageous Effects of Embodiment 2)

In Embodiment 2, the robot hand 102 is positioned at the subsidiary imaging point shifted from the target imaging point in the sense of direction to that of the vector of the off-line offset by a smaller offset than the off-line offset, and the subsidiary imaging for imaging the marker 105 is executed. The on-line offset is corrected based on the imaging result of the marker 105 in the subsidiary imaging. Consequently, the error of the on-line teaching point due to the deviation in the directions of the off-line offset and the on-line offset can be removed.

Embodiment 3

In Embodiment 3, the on-line teaching point is corrected again by performing subsidiary imaging for performing imaging at least one time with the starting point at the correction teaching point for on-line. The configuration and control other than those of the robot system and the subsidiary imaging are the same as the configuration and control of Embodiment 1. Consequently, components in FIGS. 12A to 12C common to those of Embodiment 1 are assigned signs common to those of FIG. 1, and redundant description is omitted.

(Curvature of On-Line Offset)

Figure 12A:
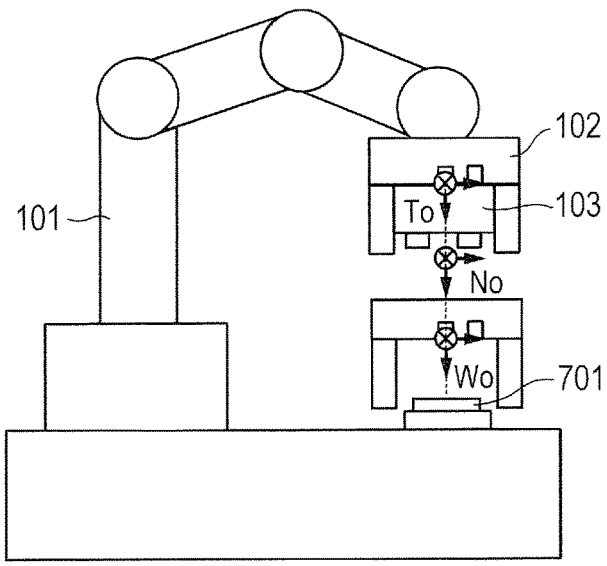
FIGS. 12A, 12B and 12C are diagrams illustrating the curvature of the on-line offset.
Figure 12B:
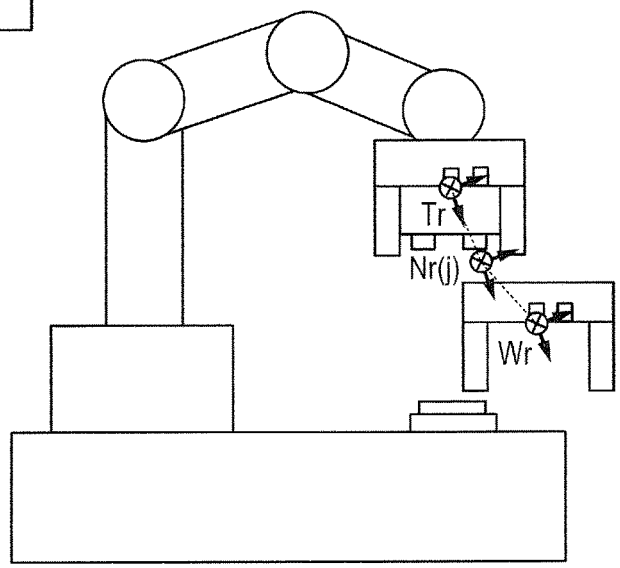
Figure 12C:
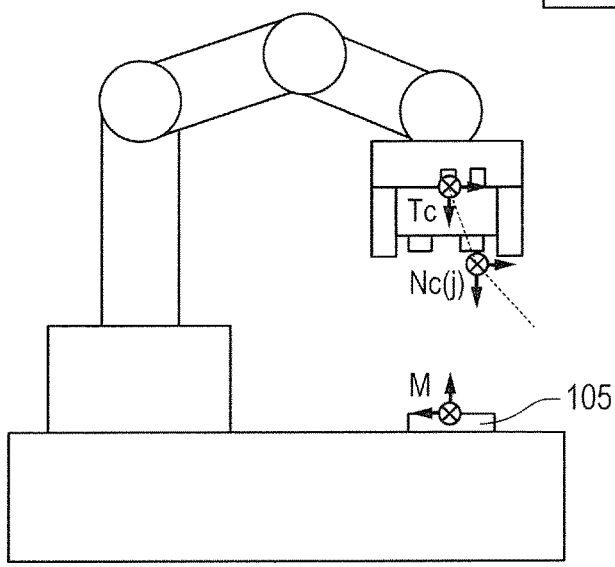

FIGS. 12A to 12C are diagrams illustrating the on-line offset. FIG. 12A illustrates off-line teaching. FIG. 12B illustrates on-line teaching. FIG. 12C illustrates correction of on-line offset.

In Embodiment 2, as illustrated in FIG. 10B, it is assumed that the robot hand 102 is moved to the correction teaching point for on-line and subsequently the robot hand 102 is linearly moved during application of the on-line offset, and then the coordinates of on-line teaching point are calculated.

Meanwhile, in Embodiment 3, as illustrated in FIG. 12B, it is also assumed that the robot hand 102 is moved to the correction teaching point for on-line and subsequently the robot hand 102 is moved in a curved manner during application of the on-line offset, and then the coordinates of on-line teaching point are calculated. In the case where the on-line offset has a long offset length, the locus of the robot hand 102 during application of the on-line offset cannot sometimes be regarded as linear.

That is, in the case where the on-line offset has a short offset length, the locus of the robot hand 102 during application of the on-line offset can be regarded as linear. Thus, in Embodiment 3, the operations and processes in Embodiment 2 are repeated in the depth of field of the stereo camera 103, and the vector of the on-line offset is corrected, thereby allowing the coordinates of the on-line teaching point to be more accurately obtained.

(Control of in Embodiment 3)

Figure 13:
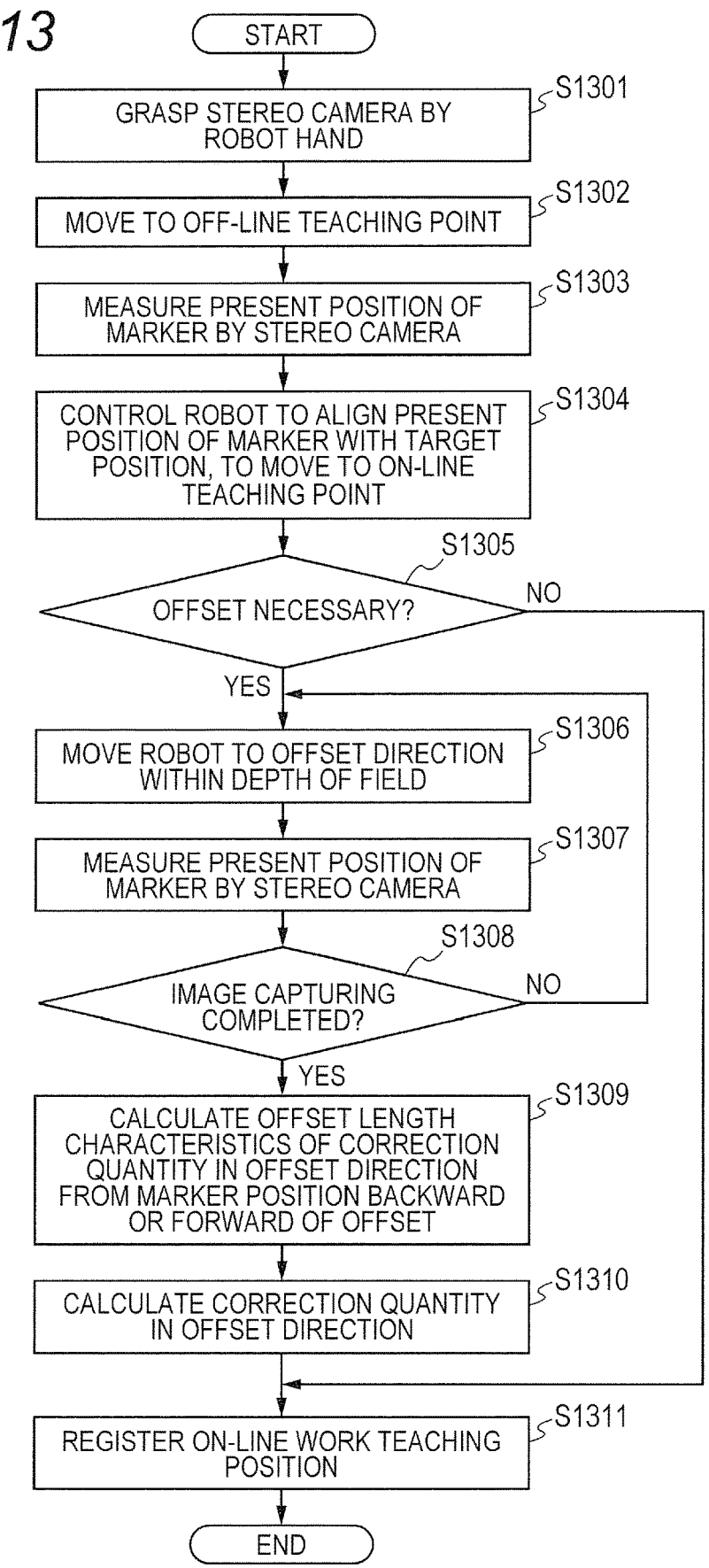
FIG. 13 is a flowchart of controlling setting of the on-line teaching point in Embodiment 3.

FIG. 13 is a flowchart of controlling setting of the on-line teaching point in Embodiment 3. Steps S1301 to S1307 illustrated in FIG. 13 are the same as steps S1101 to S1107 of Embodiment 2 illustrated in FIG. 11. Consequently, the detailed description is omitted.

The user causes the robot hand 102 to grasp the stereo camera 103 and starts the on-line teaching (S1301).

The robot controller 109 moves the robot arm 101 that grasps the stereo camera 103 to the correction teaching point for off-line $^{M}P_{To}$ (S1302).

The robot controller 109 obtains a taken image of the marker 105 through the stereo camera 103, and the image processing unit 107 measures the marker position (S1303).

The robot controller 109 moves the robot arm 101, and corrects the correction teaching point for off-line $^{M}P_{To}$ to the correction teaching point for on-line $^{M}P_{Tr}$ (S1304).

When the off-line offset $^{To}T_{Wo}$ is not set at the correction teaching point for off-line $^{M}P_{To}$ (No in S1305), the robot controller 109 registers the correction teaching point for on-line $^{M}P_{Tr}$ as the on-line teaching point $^{M}P_{Wr}$ (S1311).

When the off-line offset $^{To}T_{Wo}$ is set at the correction teaching point for off-line $^{M}P_{To}$ (Yes in S1305), the robot controller 109 moves the robot arm 101 in the direction of the on-line offset $^{To}T_{Wo}$ (S1306).

The robot controller 109 images the marker 105 in the depth of field of the stereo camera 103 while gradually moving the robot hand 102, applies image processing to the taken image, and measures the relative relationship $^{Nc}T_{M}$ between the marker 105 and the robot hand 102 (S1307).

The robot controller 109 determines whether movement to all the movement points (n times) stored in the non-volatile memory 113 has been completed or not (S1308). When movement to all the points has not been completed yet (No in S1308), the robot arm 101 is moved again in the direction of on-line offset (S1306).

After movement of the robot controller 109 to the movement points (n times) in the depth of field of the stereo camera 103 has been completed (Yes in S1308), the offset length characteristics of the correction quantity of the on-line offset are obtained from the obtained multiple relative relationships $^{Nc}T_{M}$ (S1309).

The robot controller 109 calculates the correction quantity of the on-line offset using the offset length characteristics of the correction quantity of the on-line offset, and calculates the correction quantity of the on-line offset corresponding to the offset length (S1310).

The robot controller 109 performs the process analogous to that in step S909 in Embodiment 2, calculates the corrected on-line teaching point $^{M}P_{Wr}$, and registers the point as the on-line teaching point $^{M}P_{Wr}$ in the non-volatile memory 113 (S1311).

(Offset Length Characteristics of Correction Quantity of On-Line Offset)

One example of the method of correcting the on-line offset in Embodiment 3 is described using mathematical expressions. FIG. 12A illustrates the off-line offset $^{To}T_{Wo}$. FIG. 12B illustrates the on-line offset before correction $^{Tr}T_{Wr}$.

At this time, ideally, after application of the on-line offset $^{Tr}T_{Wr}$, the robot hand 102 is brought to the on-line teaching point $^{M}P_{Wo}$. Consequently, the on-line offset $^{Tr}T_{Wr}$ is required to be corrected to the corrected on-line offset $^{Tr}T_{Wo}$.

The corrected on-line offset $^{Tr}T_{Wo}$ can be transformed as represented in the following Expression (6).

$$^{Tr}T_{Wo} = {^{Tr}T_{To}} \, ^{To}T_{Wo} \qquad \text{Expression (6)}$$

The off-line offset $^{To}T_{Wo}$ has already been known. Consequently, to correct the on-line offset, $^{Tr}T_{To}$ is required to be obtained. The calculation method is described.

With the hand coordinate system N(j) at the j-th movement being assumed, the (j−1)-th to j-th movement quantities of the robot hand 102 can be represented as the following expression.

$$^{Nr(j-1)}T_{Nr(j)} (\cong {^{Nc(j-1)}T_{Nc(j)}})$$

As illustrated in FIG. 12B, the movement quantity for one time is small, and change in position of the robot hand 102 can be regarded linear. Through use of the relative positional relationships $^{Nc(j-1)}T_M$ and $^{Nc(j)}T_M$ between the marker 105 and the robot hand 102 obtained each time of imaging (S1307), $^{Nc(j-1)}T_{Nc(j)}$ can be transformed as represented in the following Expression (7).

$$^{Nc(j-1)}T_{Nc(j)} = {^{Nc(j-1)}T_M} ({^{Nc(j)}T_M})^{-1} \qquad \text{Expression (7)}$$

Based on the translational movement component of $^{Nc(j-1)}T_{Nc(j)}$, $^{Nc(j-1)}t_{Nc(j)}$ is obtained. Wherein, the hand coordinate system Tc(=Nc(0)) measured by the stereo camera 103 is substantially identical to the off-line hand coordinate system To(=No(0)). When j=1, a relational expression: $^{Nc(0)}t_{Nc(1)} = {^{Tc}t_{Nc(1)}} = {^{To}t_{Nc(1)}}$ is obtained. When j=2, a relational expression: $^{Nc(1)}t_{Nc(2)} = {^{Nc(1)}t_{To}} + {^{To}t_{Nc(2)}}$ is obtained. In this way, by following to the relational expression at j=1, obtained is an origin of the hand coordinate systems Nc(j) viewed from the off-line hand coordinate system To. The origins of the hand coordinate systems Nr and Nc are substantially identical to each other.

Consequently, $^{Nc(j-1)}t_{Nc(j)} \cong {^{Nc(j-1)}t_{Nc(j-2)}} + {^{Nc(j-2)}t_{Nc(j-3)}} + \ldots + {^{To}t_{Nc(j)}}$. Since the origins of the hand coordinate systems Nr(j) and Nc(j) are substantially identical to each other, it is regarded such that $^{To}t_{Nr(j)} \cong {^{To}t_{Nc(j)}}$. This $^{To}t_{Nr(j)}$ can be transformed as represented in a following expression (8).

$$^{To}t_{Nr(j)} = {^{To}T_{Tr}} \, ^{Tr}t_{Nr(j)} = {^{To}T_{Tr}} \, ^{To}t_{No(j)} \qquad \text{Expression (8)}$$

Here, it is considered such that $^{Tr}t_{Nr(j)} \cong {^{To}t_{No(j)}}$. It is assumed that every translational movement component of $^{To}T_{Tr}$ is zero. Only three variables that are rotational components then remain. Consequently, Expression (8) can be solved. Through solving this expression, the relative attitude components Rx(j), Ry(j) and Rz(j) in the off-line hand coordinate system To with the robot hand 102 being at $P_{N(j)}$ and the hand coordinate system Tr calculated by the robot controller 109 are obtained.

Based on data obtained by repeating an analogous calculation until the number of movement times j reaches the total movement times n, it can be understood how Rx, Ry and Rz transition with respect to the offset length. Consequently, the offset length characteristics Rx, Ry and Rz can be obtained (S1309).

The rotational components Rx, Ry and Rz of $^{Tr}T_{To}$ can be obtained by substituting the offset length=0 into the offset length characteristics of Rx, Ry and Rz (S1310).

Substitution of the rotational components Rx, Ry and Rz of $^{Tr}T_{To}$ into Expression (6) allows the on-line offset to be accurately corrected (S1311).

(Advantageous Effects of Embodiment 3)

In Embodiment 3, the robot hand 102 is positioned at the subsidiary imaging point shifted from the target imaging point in the sense of direction to that of the vector of the off-line offset by a smaller offset than the off-line offset, and the subsidiary imaging for imaging the marker 105 is executed. The on-line offset is nonlinearly corrected based on the imaging result of the marker 105 in the subsidiary imaging. Consequently, the error of the on-line teaching point can be removed even if the deviation between the off-line offset and the on-line offset nonlinearly occurs.

Other Embodiments

In Embodiment 1, the robot hand 102 is positioned at the correction teaching point for off-line, and the marker 105 is imaged by the stereo camera 103. After imaging, the robot arm 101 is moved based on the processing result of the taken image, and the robot hand 102 is moved to the correction teaching point for on-line.

Alternatively, after imaging, without movement of the robot arm 101 based on the processing result of the taken image, the coordinate values and inclination of the on-line teaching point may be simply obtained based on the processing result of the taken image. The robot controller 109 may estimate the position offset quantity between the off-line teaching point and the on-line teaching point, based on the imaging results of the indicators 131, 132 and 133.

Alternatively, after imaging, without movement of the robot arm 101 based on the processing result of the taken image, the coordinate values and inclination of the correction teaching point for on-line may be simply obtained based on the processing result of the taken image. The movement vector of the robot hand 102 that can move the marker 105 to the target teaching point on the taken image may be obtained. The robot controller 109 may estimate the position offset quantity between the correction teaching point for off-line and the correction teaching point for on-line, based on the imaging results of the indicators 131, 132 and 133.

In Embodiment 1, the passive stereo camera 103 is used as the three-dimensional visual sensor. Alternatively, the sensor may be replaced with a three-dimensional visual sensor based on any of the operation principles of the active optical laser method, active stereo method, and. Alternatively, the sensor may be replaced with a three-dimensional visual sensor that includes an imaging unit for the marker 105 and a measurement unit for the difference to the marker 105 in a separated manner.

In Embodiment 1, the stereo camera 103 is grasped by the robot hand 102 and is detachably configured. Alternatively, the stereo camera 103 may be fixed around the robot hand 102 and thus permanently provided. The camera may also serve as a camera for imaging the indicators of the workpiece and the working stage 104 during working.

In Embodiment 1, the marker 105 includes a rectangular plate material and three circular indicators formed on the plate. Alternatively, the marker 105 and the indicators may have another shape, type, size and material that are freely selected, only if the three-dimensional position and inclination can be measured by the stereo camera 103. The indicators 131, 132 and 133 of the marker 105 do not necessarily have white circles, but may have any shape only if being measurable by the stereo camera 103. The indicators of the marker 105 may be formed by laser marking or seals. Characteristic points, such as an opening and an edge, which are intrinsic to an actual workpiece by the robot system 100 may be set as indicators.

In Embodiment 1, the marker 105 is positioned on the working stage 104. Alternatively, the marker 105 may be provided on a mount fixed on the working stage 104. The indicators may be formed on an actual workpiece instead of the marker 105.

Embodiment 1 adopts the configuration where the marker 105 is provided on the working stage 104 only during on-line teaching operation. Alternatively, the indicators may be formed on any of a jig that is always used in actual work, and the working stage 104 itself.

Figure 14:
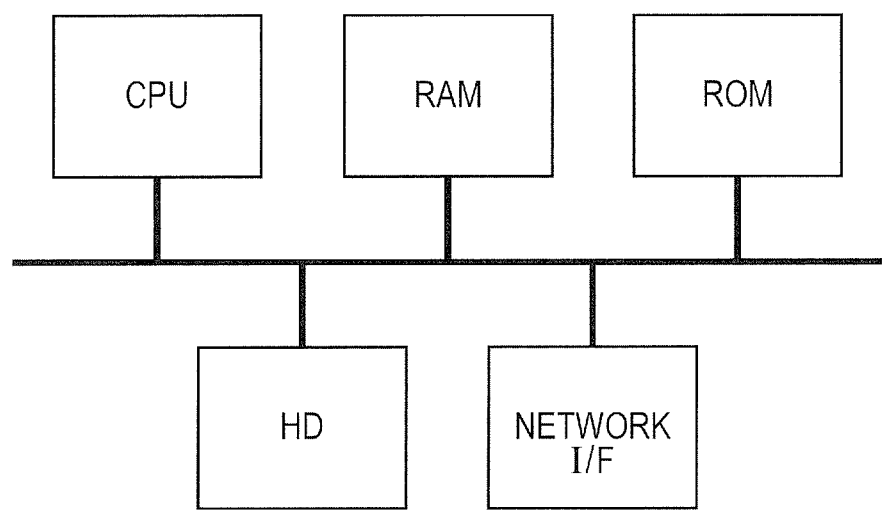
FIG. 14 is a diagram illustrating an example of a computer of a system or apparatus realizing a robot system according to one embodiment of the present invention.

Embodiment(s) of the present invention can also be realized by a computer of a system or apparatus, as shown in FIG. 14, that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-207631, filed Oct. 22, 2015, which is hereby incorporated by reference herein in its entirety.

The invention claimed is:

1. A control method for a robot apparatus that includes a robot arm for moving a working unit and a controlling unit for controlling the robot arm, the control method correcting teaching data of the robot arm using an indicator set in correspondence with a target point of the working unit and a visual sensor mounted on the working unit, and the control method comprising:
   an imaging step of, by the controlling unit, causing the visual sensor to image the indicator after offsetting the working unit from a predetermined position to an imaging point at which the indicator can be measured by the visual sensor;
   a moving step of, by the controlling unit, moving the working unit to a subsidiary target point corresponding to the target point, based on an imaging result in the imaging step; and a correcting step of, by the controlling unit, correcting the teaching data based on a position obtained by subtracting an offset quantity in the offset from the subsidiary target point.

2. The control method according to claim 1, wherein:
   the controlling unit has a target value relevant to a position of the indicator, and
   in the moving step, the controlling unit calculates a movement quantity for moving the working unit from the imaging point to the subsidiary target point, based on the position of the indicator measured at the imaging point and the target value.

3. The control method according to claim 1, wherein, in the moving step, the controlling unit moves the working unit to the subsidiary target point by controlling the robot arm.

4. The control method according to claim 1, wherein, in the correcting step, the offset quantity is a vector.

5. The control method according to claim 1, wherein, in the imaging step, the controlling unit performs subsidiary imaging of moving the working unit to a subsidiary imaging point existing on the way from the predetermined position to the imaging point and causing the visual sensor to image the indicator one or more times.

6. The control method according to claim 1, wherein:
   a state that the working unit has been positioned at the imaging point is within a range in which the indicator can be measured by the visual sensor, and
   a state that the working unit has been positioned at the predetermined position is outside the range in which the indicator can be measured by the visual sensor.

7. The control method according to claim 1, wherein:
   the teaching data includes information of the target point, and
   in the correcting step, the controlling unit corrects the teaching data by updating the position obtained by subtracting the offset quantity in the offset from the subsidiary target point as the new target point.

8. The control method according to claim 1, wherein the visual sensor is mounted on a robot hand that is the working unit.

9. The control method according to claim 1, wherein the indicator is provided on a jig positioned at a support unit for supporting an object.

10. A non-transitory computer-readable storage medium storing a control program capable of performing the control method described in claim 1.

11. A robot apparatus comprising:
   a robot arm for moving a working unit; and
   a controlling unit for controlling the robot arm,
   wherein, in a case where the controlling unit corrects teaching data of the robot arm using an indicator set in correspondence with a target point of the working unit and a visual sensor mounted on the working unit,
   the controlling unit causes the visual sensor to image the indicator after offsetting the working unit from a predetermined position to an imaging point at which the indicator can be measured by the visual sensor,
   the controlling unit moves the working unit to a subsidiary target point corresponding to the target point, based on an imaging result in the imaging, and
   the controlling unit corrects the teaching data based on a position obtained by subtracting an offset quantity in the offset from the subsidiary target point.

12. The robot apparatus according to claim 11, wherein:
   the controlling unit has a target value relevant to a position of the indicator, and
   the controlling unit calculates a movement quantity for moving the working unit from the imaging point to the subsidiary target point, based on the position of the indicator measured at the imaging point and the target value.

13. The robot apparatus according to claim 11, wherein the controlling unit performs subsidiary imaging of moving the working unit to a subsidiary imaging point existing on the way from the predetermined position to the imaging point and causing the visual sensor to image the indicator one or more times.

14. The robot apparatus according to claim 11, wherein:
a state that the working unit has been positioned at the imaging point is within a range in which the indicator can be measured by the visual sensor, and
a state that the working unit has been positioned at the predetermined position is outside the range in which the indicator can be measured by the visual sensor.

15. The robot apparatus according to claim 11, wherein:
the teaching data includes information of the target point, and
the controlling unit corrects the teaching data by updating the position obtained by subtracting the offset quantity in the offset from the subsidiary target point as the new target point.

16. An article manufacturing method of manufacturing an article using the robot apparatus described in claim 11.

* * * * *